United States Patent
Keefe et al.

(10) Patent No.: US 12,361,677 B2
(45) Date of Patent: Jul. 15, 2025

(54) OBJECT TRACKING IN LOCAL AND GLOBAL MAPS SYSTEMS AND METHODS

(71) Applicant: Teledyne FLIR Defense, Inc., Thousand Oaks, CA (US)

(72) Inventors: A. Peter Keefe, Chelmsford, MA (US); James Leonard Nute, Chelmsford, MA (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 422 days.

(21) Appl. No.: 17/692,805

(22) Filed: Mar. 11, 2022

(65) Prior Publication Data

US 2022/0309767 A1    Sep. 29, 2022

Related U.S. Application Data

(60) Provisional application No. 63/166,937, filed on Mar. 26, 2021.

(51) Int. Cl.
*G06K 9/00* (2022.01)
*G06N 5/04* (2023.01)
(Continued)

(52) U.S. Cl.
CPC ............ *G06V 10/764* (2022.01); *G06N 5/04* (2013.01); *G06T 7/70* (2017.01); *G06V 10/7788* (2022.01); *G06V 10/82* (2022.01)

(58) Field of Classification Search
CPC .. G06V 10/764; G06V 10/7788; G06V 10/82; G06N 5/04; G06T 7/70
See application file for complete search history.

(56) References Cited

U.S. PATENT DOCUMENTS

| | | | |
|---|---|---|---|
| 8,649,565 B1* | 2/2014 | Kim | G06F 18/2111 382/106 |
| 11,062,454 B1* | 7/2021 | Cohen | G01S 7/417 |

(Continued)

FOREIGN PATENT DOCUMENTS

| | | | | |
|---|---|---|---|---|
| CN | 107481284 A | * | 12/2017 | G06T 7/20 |
| CN | 107609571 A | * | 1/2018 | |

(Continued)

OTHER PUBLICATIONS

Algorithms for Cooperative Multisensor Surveillance, Robert T. Collins, et al., IEEE, 2001, pp. 1456-1477 (Year: 2001).*

(Continued)

*Primary Examiner* — Jayesh A Patel
(74) *Attorney, Agent, or Firm* — Haynes and Boone, LLP

(57) ABSTRACT

A detection device, such as an unmanned vehicle, is adapted to traverse a search area and generate sensor data associated with objects that may be present in the search area. The generated sensor data is used by a system including object detection inference models configured to receive the sensor data and output object data, a local object tracker configured to track detected objects in a local map, and a global object tracker configured to track detected objects on a global map. The local object tracker is configured to fuse object detections from the object detection inference models to identify locally tracked objects, and a Kalman filter processes frames of fused object data to resolve duplicates and/or invalid object detections. The global object tracker includes a pose manager, configured to track global objects in the global map and update the pose based on a map optimization process. User-in-the-loop processing includes a user interface for displaying and manual editing of detected object data.

20 Claims, 14 Drawing Sheets

(51) Int. Cl.
  *G06T 7/70* (2017.01)
  *G06V 10/764* (2022.01)
  *G06V 10/778* (2022.01)
  *G06V 10/82* (2022.01)

(56) References Cited

U.S. PATENT DOCUMENTS

| | | | | |
|---|---|---|---|---|
| 2018/0005015 | A1* | 1/2018 | Hou | G06V 10/751 |
| 2019/0130189 | A1* | 5/2019 | Zhou | G06V 10/7515 |
| 2019/0273909 | A1* | 9/2019 | Ye | G06T 7/579 |
| 2020/0302161 | A1 | 9/2020 | Sriram et al. | |
| 2021/0241435 | A1* | 8/2021 | Zhou | G06T 5/50 |
| 2021/0263525 | A1* | 8/2021 | Das | G06N 3/084 |
| 2022/0026920 | A1* | 1/2022 | Ebrahimi Afrouzi | G06N 7/01 |
| 2023/0194306 | A1* | 6/2023 | Liu | G01C 21/3837 701/412 |

FOREIGN PATENT DOCUMENTS

| | | | | |
|---|---|---|---|---|
| CN | 108646761 | | 12/2018 | |
| CN | 109003291 A | * | 12/2018 | |
| CN | 107315411 B | * | 4/2020 | G05D 1/0214 |
| CN | 110706252 B | * | 10/2020 | |
| KR | 1715001 B1 | * | 3/2017 | B64C 39/024 |
| WO | WO-2017183034 A1 | * | 10/2017 | G06K 9/00228 |
| WO | WO 2021/202794 A1 | | 10/2021 | |

OTHER PUBLICATIONS

Sonar-Based Real-World Mapping and Navigation, Alberto Elfes, IEEE, 1987, pp. 249-265 (Year: 1987).*
Algorithms for Cooperative Multisensor Surveillnace, Robert T. Collins, et al., IEEE, 2001, pp. 1456-1477 (Year: 2001).*
Local and Global Localization for Mobile Robots using Visual Landmarks, Stephen Se et al., IEEE, 2001, pp. 414-420 (Year: 2001).*
Sonar-Based Real-World Mapping and NAvigaiton, Alberto Elfes, IEEE, 1987, pp. 249-265 (Year: 1987).*
Classification and Counting of Composite Objects in Traffic Scenes Using Global and Local Image Analysis, Guruprasad Somasundaram et al., IEEE, 2012, pp. 69-81 (Year: 2012).*
Salient object detection via global and local cues, Na Tong et al., Elsevier, 2015, pp. 3258-3267 (Year: 2015).*
Local and Global Features for Multi Object Tracking, Luca Fiori et al., Feb. 2021, pp. 1-59 (Year: 2021).*
3D pose estimation based on planar object tracking for UAVs control., Ivan' F. Mondragon et al., IEEE, 2010, pp. 35-41 (Year: 2010).*
Robert T. Collins et al. "Algorithms for Cooperative Multisensor Surveillance", Proceedings of the IEEE, IEEE. New York, US, vol. 89, No. 10, Oct. 1, 2001 (Oct. 1, 2001), XP011044562, ISSN: 0018-9219.

* cited by examiner

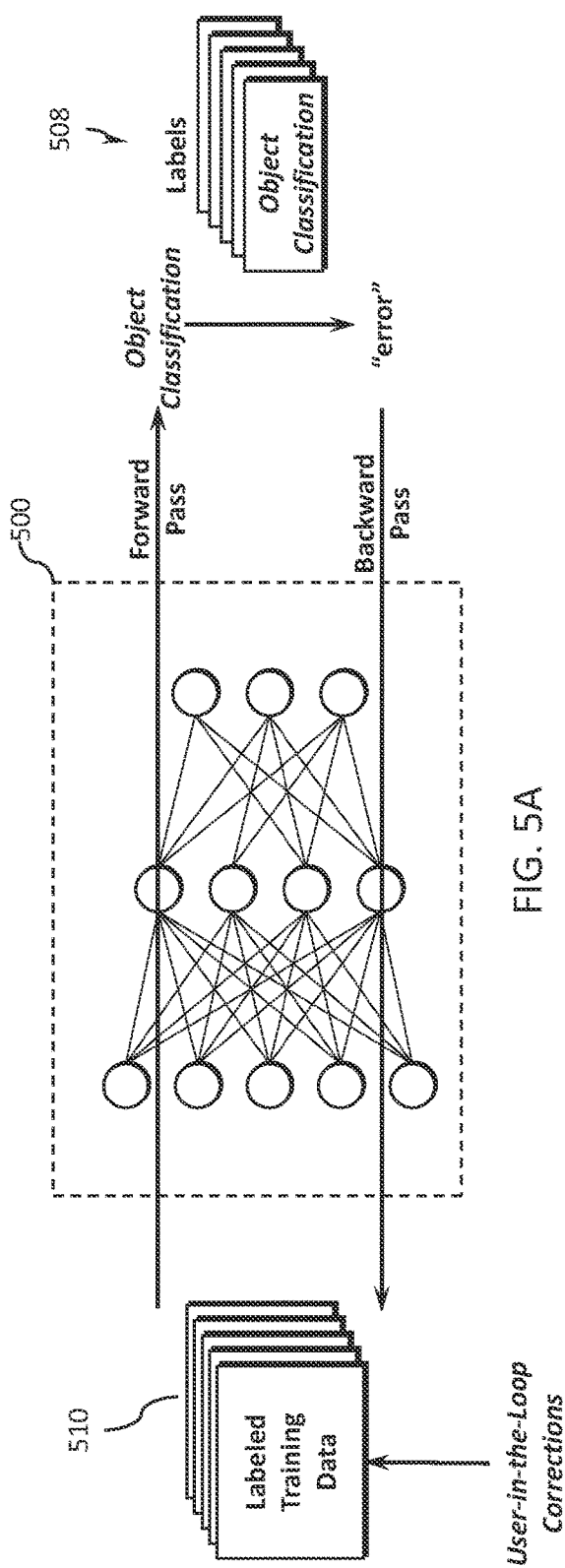
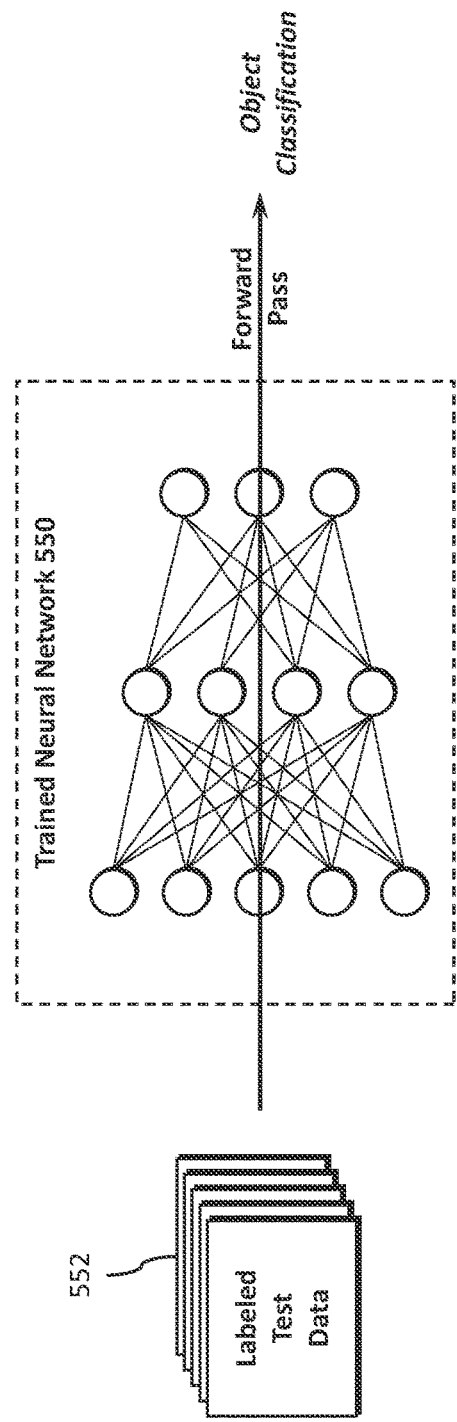
FIG. 5A
FIG. 5B

OBJECT TRACKING IN LOCAL AND GLOBAL MAPS SYSTEMS AND METHODS

CROSS-REFERENCE TO RELATED APPLICATIONS

This application claims the benefit of and priority to U.S. Provisional Patent Application No. 63/166,937 filed Mar. 26, 2021 and entitled "OBJECT TRACKING IN LOCAL AND GLOBAL MAPS SYSTEMS AND METHODS," which is incorporated herein by reference in its entirety.

TECHNICAL FIELD

One or more embodiments of the present disclosure relate generally to machine learning systems and more particularly, for example, to systems and methods for detecting, classifying and/or tracking objects in a local and/or global map.

BACKGROUND

In the field of image processing, there is an ongoing need for efficient and reliable ways to detect and classify objects of interest within a field of view (e.g., a scene) of an imaging device. Traditional systems combine a machine vision imaging component and a single board computer running rules-based image processing software. These systems are used for simple problems like barcode reading or identifying a particular feature of a known object.

Developments in machine learning have led to systems capable of more complex image analysis. In one approach, various images of an object of interest are collected into a training dataset for training a neural network to classify the object. The training images may be generated with a camera capturing images of the object at various angles and in various setting. A training dataset often includes thousands of images for each object classification, and the generation of the training dataset can be time consuming, expensive and burdensome to produce and update. The trained neural network may be loaded on a server system that receives and classifies images from imaging devices on a network. In some implementations, the trained neural network may be loaded on an imaging system itself allowing for real time object detection.

Simplified machine vision and image classification systems are available for use, but such systems are not capable of running robust trained neural networks and are difficult to adapt to various end-use scenarios. In practical implementations, limitations on memory, processing, communications, and other system resources often lead system designers to produce classification systems focused on particular tasks. A neural network may be trained for particular classification tasks for example and implemented to allow for real time operation within the constraints of the system. However, accuracy for more general and/or complex tasks is still an ongoing issue. For example, an object detection and mapping system may require detection and classification of a broad range of objects in a wide range of settings, while requiring localization accuracy for mapping the detected objects. Such systems encounter numerous issues in practice, including false detections, duplicate detections, and localization errors.

In view of the foregoing, there is a continued need for improved object detection, classification and localization solutions, including systems and methods for use in surveilling an area, detecting and classifying objects, and mapping the results.

SUMMARY

Various systems and methods are provided for detecting and tracking objects within a local map, global map, and/or other reference coordinate system. In some embodiments, a system comprises an unmanned vehicle or other sensor system configured with a multi-modal, multi-camera system and adapted to traverse a search area and generate sensor data associated with an object that may be present in the search area.

The unmanned vehicle may include a first logic device configured to fuse the sensor inputs to detect, classify and localize objects, and communicate object detection information to a control system. In some embodiments, the object detection information is used to detect, classify and localize objects using probabilities and Kalman filtering to track objects within a local and global map (and/or other reference coordinate systems). In some embodiments, the first logic device includes a plurality of inference models configured to detect object information from sensor data, a local object tracking module configured to track detected objects in a local map, a Kalman filter module configured to track object data over time to resolve errors, duplicates and other issues, and a global object tracking module configured to maintain and optimize a global map, including object classification, localization and orientation.

In various embodiments, the unmanned vehicle comprises an unmanned ground vehicle (UGV), and unmanned aerial vehicle (UAV), and/or an unmanned marine vehicle (UMV), and further comprises a sensor configured to generate the sensor data, the sensor comprising a visible light image sensor, an infrared image sensor, a radar sensor, and/or a Lidar sensor. The present disclosure may also be implemented using other vehicles (e.g., manned vehicle) and/or devices.

The first logic device may be further configured to execute a trained neural network configured to receive a portion of the sensor data and output a location of an object in the sensor data and a classification for the located object, wherein the trained neural network is configured to generate a confidence factor associated with the classification. In addition, the first logic device may be further configured to construct one or more maps based on generated sensor data using the local object tracking module, the Kalman filtering module, and the global object tracker module.

The system may also include a control system configured to facilitate user monitoring and/or control of the unmanned vehicle during operation including a display screen, a user interface, and a second logic device configured to receive real-time communications from the unmanned vehicle relating to detected objects, access the stored object analysis information during a period when the unmanned vehicle is in communication range of the control system, display at least a portion of the object analysis information for the user to facilitate detection and classification of the detected object by the user, and/or update object detection information in accordance with user input. The second logic device may be further configured to generate a training data sample from the updated object detection information for use in training an object classifier, retrain the object classifier using a dataset that includes the training data sample, and determine whether to replace a trained object classifier with the retrained object classifier, the determination based at least in part on a comparative accuracy of the trained object classifier and the retrained object classifier in classifying a test dataset. In addition, the second logic device may be further configured to, if it is determined to replace the trained object classifier with the retrained object classifier, download the retrained object classifier to the unmanned vehicle to replace the trained object classifier; and add the training data sample to the training dataset.

In some embodiments, a detection device, such as an unmanned vehicle, is disclosed and adapted to traverse a search area and generate sensor data associated with objects that may be present in the search area. The generated sensor data is used by a system including object detection inference models configured to receive the sensor data and output object data, a local object tracker configured to track detected objects in a local map, and a global object tracker configured to track detected objects on a global map. The local object tracker is configured to fuse object detections from the object detection inference models to identify locally tracked objects, and a Kalman filter processes frames of fused object data to resolve duplicates and/or invalid object detections. The global object tracker includes a pose manager, configured to track global objects in the global map and update the pose based on a map optimization process. User-in-the-loop processing includes a user interface for displaying and manual editing of detected object data.

The scope of the disclosure is defined by the claims, which are incorporated into this section by reference. A more complete understanding of the disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5A illustrates an example neural network training process, in accordance with one or more embodiments.

FIG. 5B illustrates a validation process for the neural network of FIG. 4A, in accordance with one or more embodiments.

Embodiments of the disclosure and their advantages are best understood by referring to the detailed description that follows. It should be appreciated that like reference numerals are used to identify like elements illustrated in one or more of the figures.

DETAILED DESCRIPTION

Figure 1:
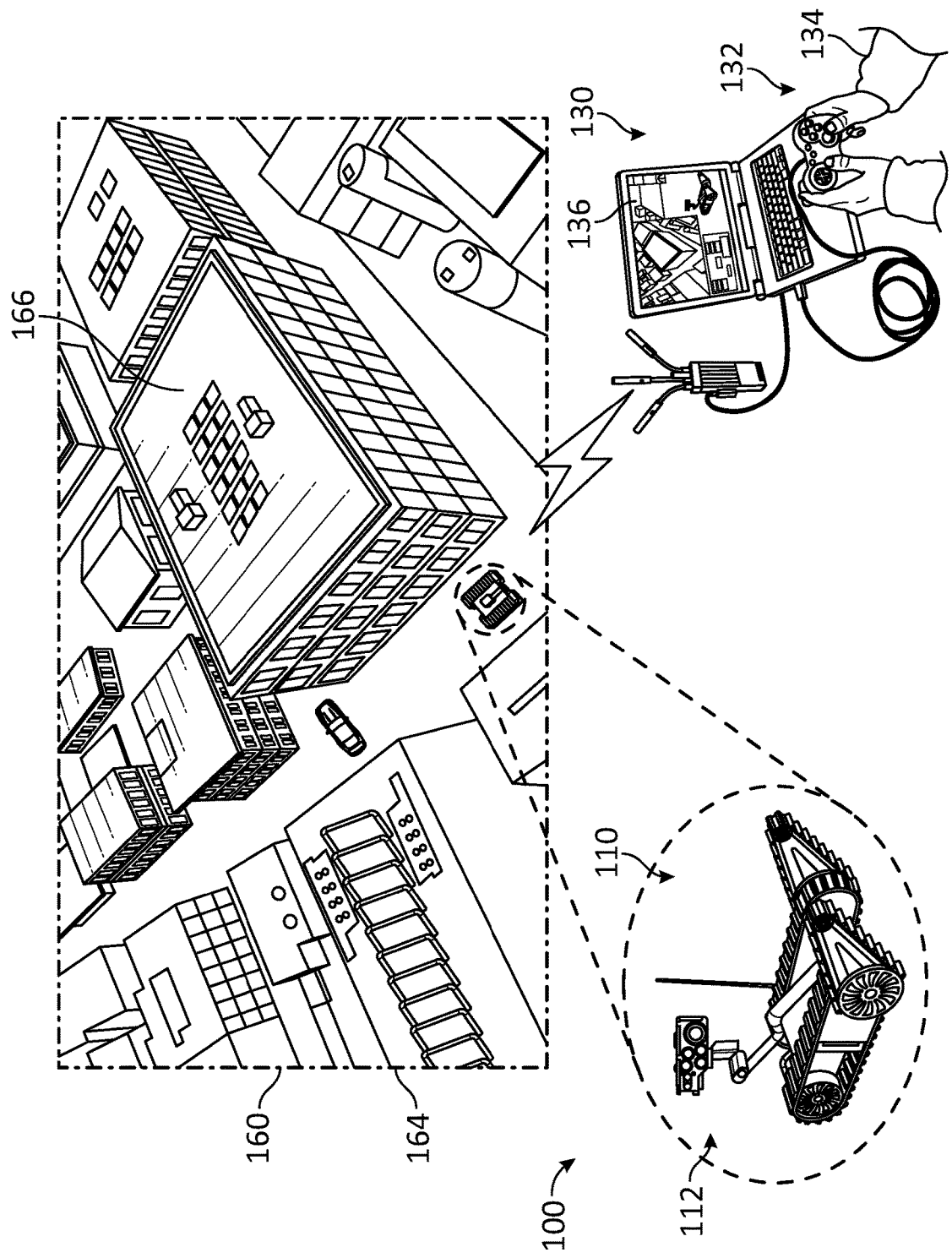
FIG. 1 illustrates an example object detection system, in accordance with one or more embodiments.

Aspects of the present disclosure relate generally to object detection and classification, including detecting and tracking objects in three dimensions within a local or global map. In some embodiments, object data may be captured using a multi-modal, multi-camera system, for example implemented on a mobile robot (e.g., unmanned ground vehicle (UGV), unmanned aerial vehicle (UAV), unmanned marine vehicle (UMV), etc.) or other device. Data capture with a multi-modal, multi-camera system will likely result in objects being seen by multiple sensors, from multiple perspectives, at the same time. One or more errors in the calibration of these sensors and their transforms could result in object detection errors, such as duplication of detection data. In some embodiments, a Kalman filter that takes into account the position of previous object estimates, the quality of the estimate, and an object classification to filter the object detections to remove duplicates and other invalid detections. The Kalman filter may be implemented, for example, as an unscented Kalman filter to estimate object data from a series of sensor measurements to track object's pose and inference probability and merge duplicates with respect to the "base_footprint" frame.

In various aspects of the present disclosure, systems and methods are implemented to calculate object detection probabilities and perform Kalman filtering to track objects in three dimensions within a local map, a global map, and/or other reference coordinate system. The system may be implemented as any system or device configured to capture sensor data for object detection and localization. In some embodiments, an unmanned ground vehicle with a fused multi-modal multi-camera system is used to explore an area and map detected object locations. The sensors may be configured to use a common map representation, whether local or global, and the object detections from one or more sensor can be looked up to determine if the object already exists in the map. If a new object is detected, it can be added to the map. If a previously detected object is detected, the new object information (e.g., object location, bounding box, object type, confidence) can be combined with the existing object information to refine the three-dimensional (3D) position, classification, or pose of the object.

In some embodiments, an object detection and localization solution includes a group of components designed to achieve object permanence within the map, while allowing for position updates due to map optimizations. A local object tracker component fuses inference detections across multiple inference models into a common frame ID. In various embodiments, the interference models may include Deep Neural Network (DNN) models, such as Convolutional Neural Network (CNN) models, or other machine learning/ artificial intelligence models trained to generate object detection information from sensor data, including one or more of object location, object type, object pose, object bounding box, confidence score, and/or other relevant object information (e.g., information relevant to a particular task/ scenario).

In various embodiments, any suitable neural network inference model may be used as long as the model generates a detection vector including an object type, confidence score, and bounding box location. The system uses the Kalman filter to merge multiple locally tracked objects into a single tracked object, based on available information including object type sizes. In some embodiments, the system is configured to track one object in a single location. Use of the Kalman filter also allows the local object tracker to override the inference probabilities from one or more sensors with stronger detections from other sensors. For example, if one camera sees the edge of one object type, with 40% probability, and another camera sees the same object as a different object type, with 85% probability, in the same location, the local object tracker can filter to the more probable object type with an adjusted probability (e.g., less than 85% probability to take into account the detection of the other object type).

In some embodiments, the objects tracked in the local frame of the sensor system are treated as non-persistent observations. As the sensor system moves, the system is configured to minimize bias in the Kalman filter if another object appears in the same spatial relativity as a previous object. The local object tracker is configured to track the objects in the vicinity of the system. The tracked objects may be displayed to a user as markers in a diagnostic viewer user interface, allowing the user to see what is being detected around the sensor system, without having to look at multiple camera streams with typical detection boxes.

In various embodiments, the global object tracker receives the locally tracked objects from the local object tracker and tracks them in the global map frame. The global object tracker may also use a Kalman filter (e.g., unscented Kalman filter) to track object pose and inference probabilities. In some embodiments, the mapping algorithm is configured to periodically run optimizations and update the objects tracked in the global object tracker. It is observed that updating the object locations with map optimizations improves spatial accuracy in tested systems (e.g., otherwise, tracked objects may no longer be spatially accurate after certain map optimization processing).

In some embodiments, the global object tracker is configured to include a pose manager component that tracks the map keyframes. After a new object is identified, the global object tracker uses the pose manager component to get the current map position to translate the locally tracked object into the map frame. The global object tracker may also be configured to regularly update the known list of tracked objects with the pose manager and update the object's pose in the case that optimization has occurred. In some embodiments, the global object tracker pose updates, based on map optimizations, can be manually triggered.

In various embodiments, the system determines an image depth to extract the depth of a detected object, and the system is configured to manage null and NaN values. For example, for images captured using an infrared camera some materials in the scene may be infrared absorbent creating invalid depth readings. There are several image processing techniques that can be utilized to fill holes and repair the depth image, but they often result in changing the depth values of the surrounding pixels. In some embodiments of the present disclosure, the system samples an object's depth at a frame rate (e.g., 15 fps) sufficient to allow the system to ignore frames where the depth extraction fails and only those use frames that provide accurate readings. Using this approach simplifies the depth calculation problem and provides accurate depth readings of the objects.

Example System: Human-in-the-Loop

In various embodiments, a human-in-the-loop solution facilitates operator review of the object detections, providing a check to identify false or inaccurate object detections. For example, a system implemented in an unmanned ground vehicle may operate in full autonomous exploration mode where it detects, classifies and localizes objects as described herein (e.g., using a local object tracker, Kalman filter, global object tracker, etc.), and provide a representation of the detected object on an operator terminal for review by the operator to identify false detections.

Embodiments include systems where data describing objects detected by a sensor system are automatically detected, localized and mapped, and may include a human-in-the-loop feature to send object information to a user to approve and/or update various parameters, such as detected type, position, color, and/or other parameters. The system may be configured to record and play back data that was captured by the sensor system during the detection of the object, providing the control station user a view of what led up to the detection of the object and the ability to supplement or correct the object information (e.g., object classification, object position, etc.). The user interface may include a real-time virtual reality, augmented reality or other three-dimensional interface of the 3D map and other telemetry data from the UGV to make it provide the user with additional views to make it easier for the user to approve/ refine the collected sensor data.

In various embodiments, a remote device captures sensor data from an environment and performs object detection, classification, localization and/or other processing on the captured sensor data. For example, a system may include an unmanned ground vehicle (UGV) configured to sense, classify and locate objects in its environment, while in wireless communication with a control station that facilitates additional processing and control. The UGV may include a runtime object detection and classification module that is limited by the runtime environment, and may produce false positives, misclassifications, and other errors that are undesirable for a given application. In some embodiments, these and other object detection errors are reduced through use of one or more DNN/CNN inference models, a local object tracking module, a Kalman filtering module, and a global object tracker module, as described herein.

In operation, a user at the control station may be able to correct the data in real time. When there is lack of communications between the UGV and the control station, it may be desirable and convenient to later review and verify/correct the runtime detections of the UGV. Inaccuracies in the detections could lead to errors in the positioning of detected objects in three-dimensional (3D) space. To correct these errors, it may be desirable to have a user of the control station reposition the object within the two-dimensional (2D) and/or 3D map. To do this, the UGV is configured to record data about the detected object (e.g., data sufficient to understand what a detected object looks like visually) and details about the position of the object. In some embodiments, the system is configured to capture the visible images of the object, but also position and location information from one or more sensors, such as point cloud data from a light detection and ranging (Lidar) system, real-world coordinate information from a global positioning satellite (GPS) system, and/or other data from other sensor systems, that applies to the scenario.

The object detection systems and methods described herein may be used in various object detection contexts. For example, the system may include a robot (e.g., a UGV) that senses aspects of an environment, detects objects in the sensed data, and stores related object data in a database and/or local/global map of those object detections. The data may be directed to a control station where a user may approve and/or augment those detections before forwarding to the database.

In some embodiments, the detection of objects is performed using a trained artificial intelligence system, such as a deep neural network (DNN) or convolutional neural network (CNN) classifier that outputs a location of a box around detected objects in a captured image. In some cases, further detail may be desired, such as an understanding of the location of a reference point on the detected object. The systems described herein may be configured to create an augmentation to the data created by the artificial intelligence system, providing the user with an interface to verify or correct a particular point of interest and then transform the data into the correct reference frame. The present disclosure may be used with an artificial intelligence, machine learning, neural network or similar system that identifies an object type and/or class and the object position. In various embodiments, the classifier also outputs a probability indicating a confidence factor in the classification. The system is adaptable to a variety of machine learning frameworks, even systems that produce a large amount of error in the classification, provided the system produces a reasonable starting point for local/global object tracking framework and/or the user to make the correction.

Referring to FIG. 1, an example object detection system 100 will now be described, in accordance with one or more embodiments. A robot 110 with imaging and depth sensors 112 is controlled by a controller 130 with user interface 132 with an interactive display 136 that commands the robot 110 to explore autonomously, such as through a real-world location 160. While the robot 110 is exploring autonomously, it may lose communication with the controller 130 for a period of time (e.g., due to distance, obstruction, interference, etc.), during which the controller 130 receives no or partial information from the robot 110. While the robot 110 is out of range of the controller 130, it continues to collect data about the location 160. In some embodiments, the robot 110 is configured to detect an object of interest (e.g., car 162) and place that object in a local map that the robot 110 is generating and storing in memory. The robot 110 may continue searching for and detecting objects of interest, such as building 164 and building 166 and/or other objects of various sizes, before returning to within communications range of the controller 130.

After the controller 130 re-establishes communications with the robot 110, the controller 130 accesses the updated map, which includes the new objects that have been detected, including their positions, type, and confidence level as determined by the robot 110. In some embodiments, a real-time VR view of the 3D map and other telemetry from the robot 110 is utilized to make it easier for the user 134 to approve/refine using the controller 130. The user input may be used to re-train both the detections and the positioning of the objects and update the model for use on the next detection cycle.

Figure 2:
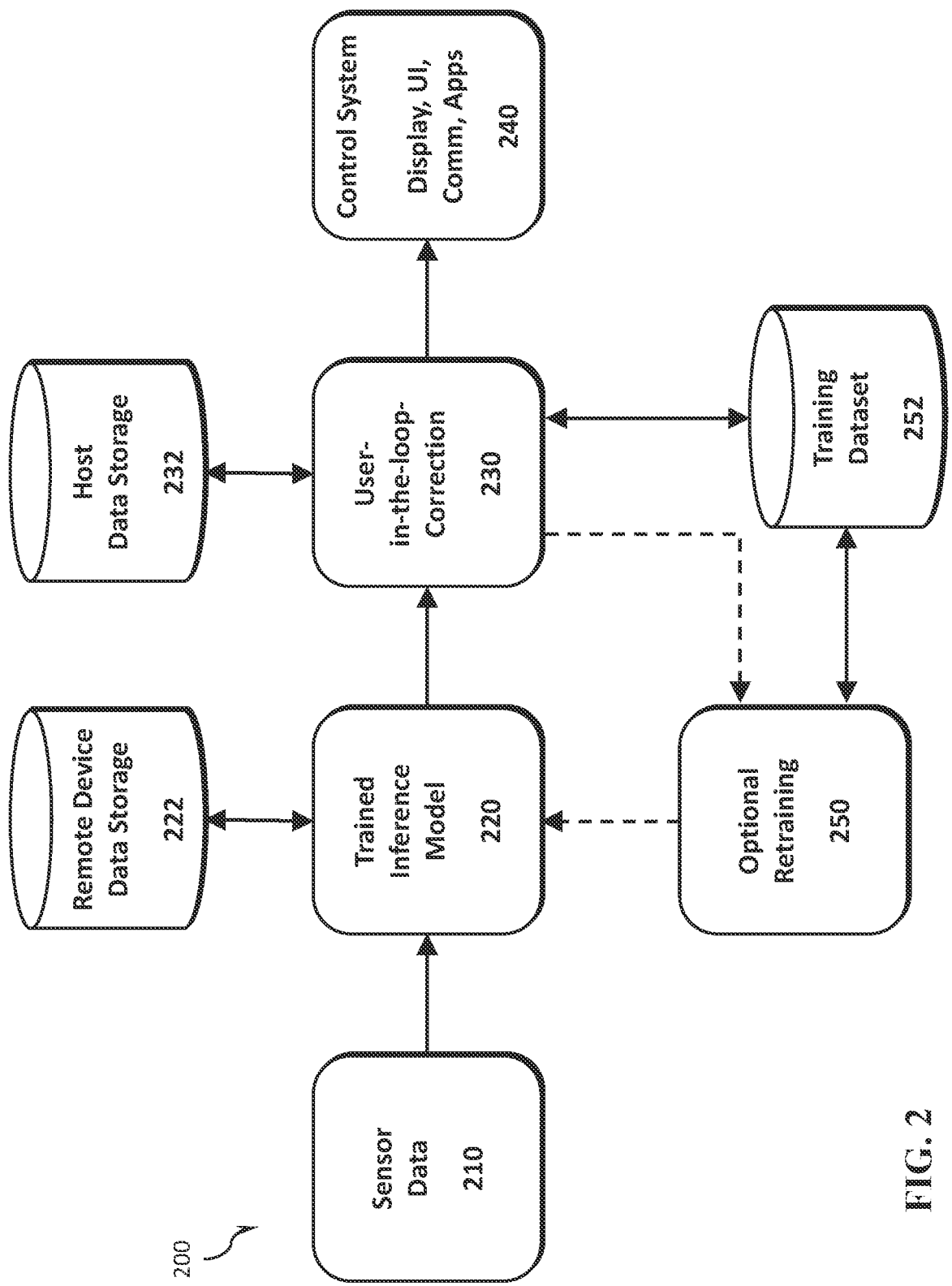
FIG. 2 illustrates an example operation of a user-in-the-loop object detection system, in accordance with one or more embodiments.

The operation of a user-in-the loop object detection system will now be described in further detail with reference to FIG. 2, which illustrates an example system operation in accordance with one or more embodiments. A process 200 receives sensor data 210 from one or more sensor systems of a remote device, such as a UGV, an unmanned aerial vehicle (UAV), unmanned marine vehicle, or other remote device that includes a sensor for acquiring environmental data, and a processing component for detecting objects in the sensor data. The remote device processing components include a trained inference model 220 configured to receive sensor data and output detected objects, object locations, object classifications, and/or a classification confidence factor. In some embodiments, the trained inference model 220 includes a convolutional neural network trained on a training dataset 252 to detect, classify and locate objects in the sensor data. The trained inference model 220 may further include sensor data processing components for one or more of the sensors such as image processing algorithms, radar data processing algorithms, Lidar processing algorithms, and/or other sensor data processing algorithms.

The remote device is configured to store object data, map data and/or user-in-the-loop data in a remote device data storage 222. In one embodiment, the remote device is configured to detect when communications with the controller system are lost and store data for use in a user-in-the-loop correction process. This data may include an identification of object detections and data acquired or produced during the period without communications, addition data collection such pictures and video of the scene preceding, during and after detection, and other data. In other embodiments, the remote device is configured to store the user-in-the-loop data during operation, even when communication with the controller system is active.

After the remote device is back in communication with the controller system, which may include returning to a home location, the user-in-the-loop-correction process 230 can access and the data stored on the remote device data storage 222. The user-in-the-loop-correction process 230, identifies for the user objects detected and classified during periods where communications were lost, and provides an interface allowing the user to walk through the detection and make corrections to the classification, location of the object, a point of interest on the object, and/or other collected data. The user interface may include a VR/AR interface allowing the user to explore the captured data and map to aid in the user corrections. The user interface may include a display and control over video of the detection, including forward, reverse, pause, zoom, and other video controls as known in the art. The user interface may also display the local map constructed by the remote device and/or global map constructed by the system. The controller stores the data in a host data storage 232, which may include one or more of a local storage device, a networked storage device, a cloud storage device, or other suitable storage device or system.

After corrections are made by the user to the objects detected during periods without and/or with communications between the remote device and the controller system, the corrected object classification information may be formatted for use in the training dataset 252. In an optional retaining process 250, the control system is configured to retrain the inference model 220 using the updated training dataset 252 and replace the trained inference model 220 if certain criteria are met. In one embodiment, the performance of the updated artificial intelligence training model is tested using a test dataset, and the results are compared against the performance of the current trained inference model 220 using the same dataset. The system may be configured, for example, to replace the trained inference model 220 if the performance of the updated model is above a certain threshold factor. In the illustrated embodiment, the user accesses the system using a control system 240, that includes a display, user interface, communications components, data processing applications, and user applications.

Figure 3:
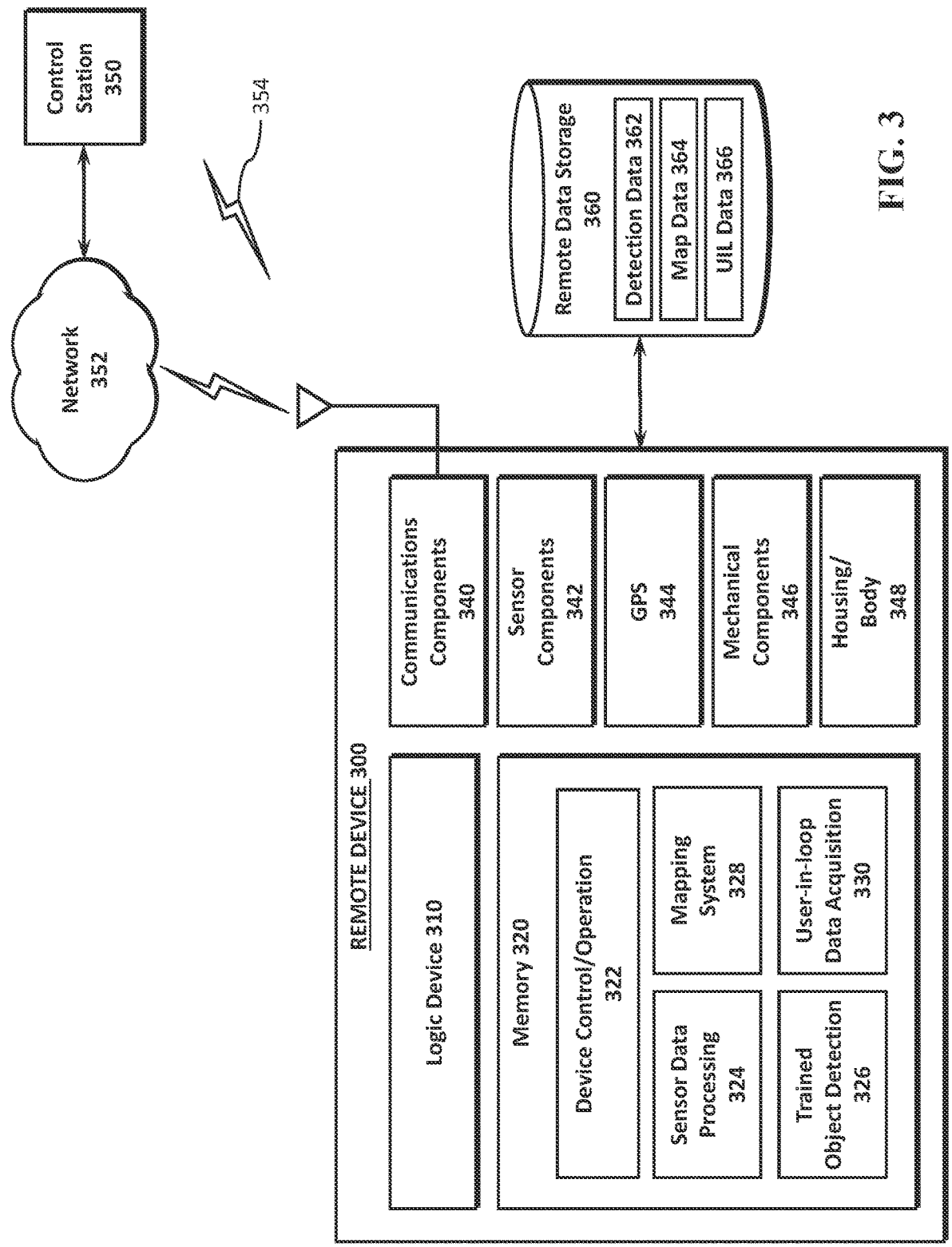
FIG. 3 illustrates an example remote device configured to process object detection data, in accordance with one or more embodiments.

An example embodiment of a remote device will now be described with reference to FIG. 3. In some embodiments, a remote device 300 is configured to communicate with a control station 350 over a wireless connection 354 or other suitable connection. As illustrated, the remote device 300 may include an unmanned vehicle, such as a UGV, UAV or UMV or other device configured to travel and collect environmental data under control of user at a control station. In various configurations, the user may control, interact and/or observe the activity of the remote device 300 through the control station 350 in real-time and/or at a later time to review and correct object detections.

The remote device 300 is generally configured to capture and analyze sensor data to detect and classify objects. The remote device 300 includes a logic device 310, a memory 320, communications components 340, sensor components 342, GPS 344, mechanical components 346, and a housing/body 348.

Logic device 310 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), a graphics processing unit and/or any other appropriate combination of processing device and/or memory configured to execute instructions to perform any of the various operations described herein. Logic device 310 is adapted to interface and communicate with components 320, 330, 340, and 350 to perform method and processing steps as described herein.

It should be appreciated that processing operations and/or instructions may be integrated in software and/or hardware as part of logic device 310, or code (e.g., software or configuration data) which may be stored in memory 320. Embodiments of processing operations and/or instructions disclosed herein may be stored by a machine-readable medium in a non-transitory manner (e.g., a memory, a hard drive, a compact disk, a digital video disk, or a flash memory) to be executed by a computer (e.g., logic or processor-based system) to perform various methods disclosed herein.

Memory 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory.

In various embodiments, logic device 310 is adapted to execute software stored in memory 320 and/or a machine-readable medium to perform various methods, processes, and operations in a manner as described herein. The software includes device control and operation instructions 322 configured to control the operation of the remote device, such as autonomous driving, data acquisition, communications and control of various mechanical components 346 of the remote device 300. The software further includes sensor data processing logic 324 configured to receive captured data from one or more sensor components 342 and process the received data for further use by the remote device 300. The software further includes trained object detection models 326 configured to receive processed sensor data and output object detection and classification information that may include object location and a confidence factor for the classification.

The memory 320 also stores software instructions for execution by the logic device 310 for mapping the environment and user-in-loop data acquisition. The mapping system 328 is configured to use the sensor data, object detection and classification information, GPS data from GPS 344, and other available information to construct a map of the sensed environment as the remote device 300 traverses the area. In some embodiments, the mapping system 328 includes a local object tracker, a Kalman filtering module, and a global tracker with pose manager, as disclosed herein. The user-in-loop data acquisition logic 330 is configured to detect whether the remote device 300 has lost communications with control station 350 and store additional data, such as video captured before, during and after object detection, other sensor data relevant to object classification, GPS location data, and other information to aid the user of the control station 350 in visually confirming and/or correcting object detection and classification information. The memory 320 is further configured to store object detection data 362, map data 364 and user-in-the-loop data 366. In some embodiments, the remote device 300 includes a separate remote data storage 360.

The sensor components 342 include a plurality of sensors configured to sense and capture information about the surrounding environment. The sensor components 342 include one or more image sensors for capturing visible spectrum and/or infrared spectrum images of a scene as digital data. Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

The sensor components 342 may further include other sensors capable of sensing characteristics of one or more objects in the environment, such as a radar system, a Lidar system, or other sensor system. Radar and/or Lidar systems are configured to emit a series of pulses or other signals into the scene and detect pulses/signals that are reflected back off of objects in the scene. The components produce signal data representing objects in the scene and corresponding sensor data processing logic 324 is configured to analyze the signal data to identify the location of objects within the scene. Logic device 310 may be adapted to receive captured sensor data from one or more sensors, process captured signals, store sensor data in memory 320, and/or retrieve stored image signals from memory 320.

The communications components 340 include circuitry and components (e.g., an antenna) for communicating with other devices using one or more communications protocols (e.g., a wireless communications protocol). The communication components 340 may be implemented as a network interface component adapted for communication with a network 352, which may include a single network or a combination of multiple networks, and may include a wired or wireless network, including a wireless local area network, a wide area network, a cellular network, the Internet, a cloud network service, and/or other appropriate types of communication networks. The communications components 340 are also configured, in some embodiments, for direct wireless communications with the control station 350 using one or more wireless communications protocols such as radio control, Bluetooth, Wi-Fi, Micro Air Vehicle Link (MAVLink), and other wireless communications protocols.

GPS 344 may be implemented as a global positioning satellite receiver, a global navigation satellite system (GNSS) receiver, and/or other device capable of determining an absolute and/or relative position of the remote device 300 based on wireless signals received from space-born and/or terrestrial sources, for example, and capable of providing such measurements as sensor signals. In some embodiments, GPS 344 may be adapted to determine and/or estimate a velocity of remote device 300 (e.g., using a time series of position measurements).

The mechanical components 346 include motors, gears, wheels/tires, tracks and other components for moving remote control across the terrain and/or operating physical components of the remote device 300. In various embodiments, one or more of the mechanical components 346 are configured to operate in response to instructions from logic device 310. The remote device 300 includes a housing 348 that protects the various components of remote device 300 from environmental or other conditions as desired.

Figure 4:
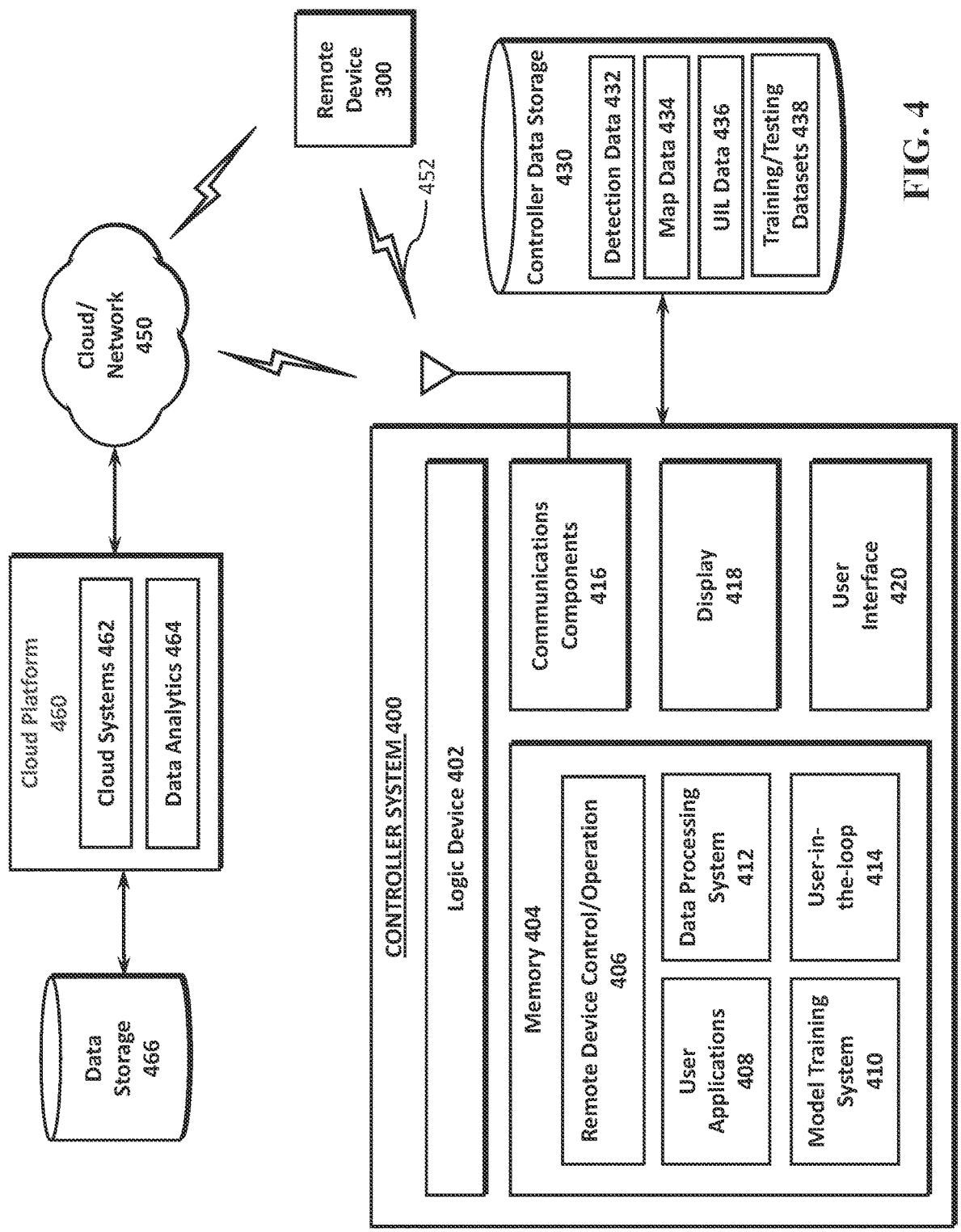
FIG. 4 illustrates an example control station configured for user-in-the-loop processing of object detection data, in accordance with one or more embodiments.

An example controller system for use with remote device 300 will now be described with reference to FIG. 4. A controller system 400 is configured to communicate with remote device 300 across a wireless communications link 452, and/or through a network, such as cloud/network 450, to interface with the remote device 300. In the illustrated embodiment, the controller system 400 includes a logic device 402, a memory 404, communications components 416, display 418 and user interface 420.

The logic device 402 may be include, for example, a microprocessor, a single-core processor, a multi-core processor, a microcontroller, a programmable logic device configured to perform processing operations, a DSP device, one or more memories for storing executable instructions (e.g., software, firmware, or other instructions), a graphics processing unit and/or any other appropriate combination of processing device and/or memory configured to execute instructions to perform any of the various operations described herein. Logic device 402 is adapted to interface and communicate with various components of the controller system including the memory 404, communications components 416, display 418 and user interface 420.

Communications components 416 may include wired and wireless interfaces. Wired interfaces may include communications links with the remote device 300, and may be implemented as one or more physical network or device connect interfaces. Wireless interfaces may be implemented as one or more WiFi, Bluetooth, cellular, infrared, radio, MAVLink, and/or other types of network interfaces for wireless communications. The communications components 416 may include an antenna for wireless communications with the remote device during operation.

Display 418 may include an image display device (e.g., a liquid crystal display (LCD)) or various other types of generally known video displays or monitors. Under interface 420 may include, in various embodiments, a user input and/or interface device, such as a keyboard, a control panel unit, a graphical user interface, or other user input/output. The display 418 may operate as both a user input device and a display device, such as, for example, a touch screen device adapted to receive input signals from a user touching different parts of the display screen.

The memory 404 stores program instructions for execution by the logic device 402 including remote device control/operation instructions 406, user applications 408, model training system 410, data processing system 412, and user-in-the-loop applications 414. Data used by the controller system 400 may be stored in the memory 404 and/or stored in a separate controller data storage 430. The remote device control and operation instructions 406 facilitate operation of the controller system 400 and interface with the remote device 300, including sending and receiving data such as receiving and displaying a real-time video feed from an image sensor of the remote device 300, transmitting control instructions to the remote device, and other operations desired for a particular implementation. The user applications 408 include system configuration applications, data access and display applications, remote device mission planning applications, and other desired user applications.

The model training system 410 generates trained inference models for implementation on the remote device 300 and the controller system 400. In some embodiments, one or more aspects of the model training system 410 may be implemented through a remote processing system, such as a cloud platform 460, that includes cloud systems 462, data analytics 464 modules, and data storage 466. In some embodiments, the cloud platform 460 is configured to perform one or more functions of the controller system 400 as described herein. The data processing system 412 is configured to perform processing of data captured by the remote device 300, including viewing, annotating, editing and configuring map information generated by the remote device 300.

The user-in-the-loop applications 414 are configured to facilitate user review, confirmation, refinement, and correction of the object detection data, and improvement to the trained inference models. In some embodiments, the user-in-the-loop applications 414 include processes for accessing object detection data and user-in-the-loop data (e.g., UIL data 436) from the remote device 300 corresponding to periods without communication between the controller system 400 and the remote device 300 (and/or other periods as defined by the system, such as periods associated with object classifications that have a confidence factor below a threshold) and facilitating an interactive display providing the user with a visual representation of the object detection data. In some embodiments, the visual representation includes stored video from before, during, and after detection, display of other sensor data, and display of the object detection data. The user may control the display to focus on desired aspects of the object and/or object detection data and input confirmation on object classification, refinement of object classification data (e.g., manual adjusting object location, manually identifying a point of interest on the object, etc.) and corrections to object classification data. In some embodiments, the object detection and classification data (e.g., detection data 432) may be combined with map data 434 generated by the remote device 300 and/or provided from another source (e.g., through the cloud platform 460). The map data 434 may include detection object information, local map data, global map data and/or map data representing a different reference coordinate system as disclosed herein. In some embodiments, the display 418 and user interface 420 include a virtual reality headset or similar device allowing the user to interact with the data in a three-dimensional space.

In some embodiments, the user-in-the-loop applications 414 are further configured to generate labeled training data to the model training system 410 representing corrections and/or refinements to the object detection data generated by one or more trained inference models. In one implementation, user corrections and refinements are provided to the model training system 410 for consideration in adding to the training and/or testing datasets 438. The model training system 410 is configured to compare training results with and without the user corrections. If the accuracy of the inference model is determined to be improved by including of the new training data, then the new training data is added to the training dataset and the model training system 410 generates an updated inference model to replace the object detection model implemented by the remote device 300.

Referring to FIG. 5A, an example a neural network that may be used to generate trained training models will be described, in accordance with one or more embodiments. The neural network 500 is implemented as a deep neural network, convolutional neural network or other suitable neural network that receives a labeled training dataset 510 to produce object detection information 508 for each data sample. The training dataset represents captured sensor data associate with one or more types of sensors, such as infrared images, visible light images, radar signal data, Lidar signal data, GPS data, and/or other data used by the remote device 300. For object classification in images, the images may comprise a region of interest from a captured image that includes an object to be identified.

The training includes a forward pass through the neural network 500 to produce object detection and classification information, such as an object location, an object classification, and a confidence factor in the object classification. Each data sample is labeled with the correct classification and the output of the neural network 500 is compared to the correct label. If the neural network 500 mislabels the input data, then a backward pass through the neural network 500 may be used to adjust the neural network to correct for the misclassification. Referring to FIG. 5B, a trained neural network 550, may then be tested for accuracy using a set of labeled test data 552. The trained neural network 550 may then be implemented in a run time environment of the remote device to detect and classify objects.

Figure 6:
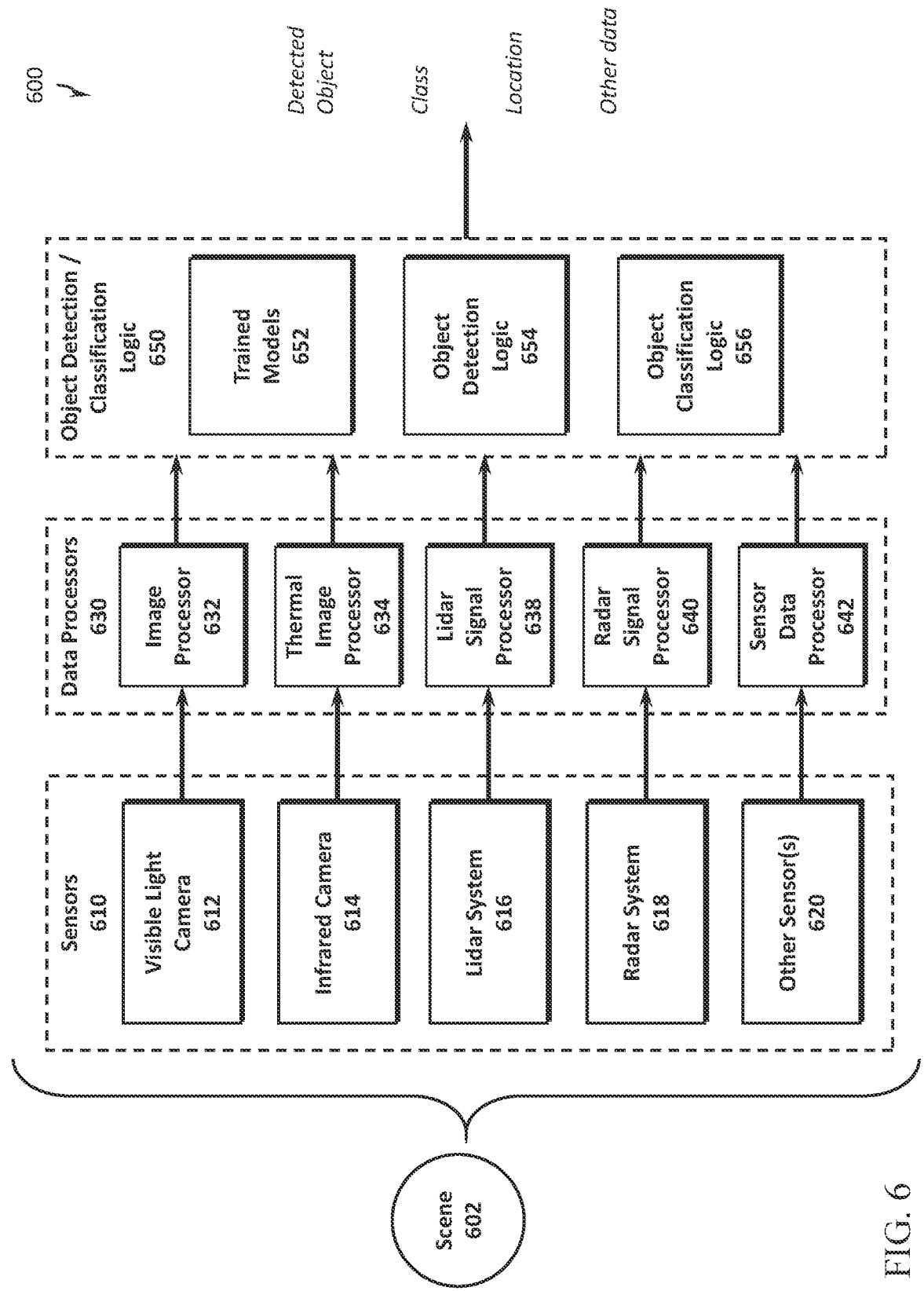
FIG. 6, illustrates an example object detection system, in accordance with one or more embodiments.

Referring to FIG. 6, an example object detection system will now be described in accordance with one or more embodiments. The object detection system 600 may be implemented in a remote device or other system as described herein. The object detection system 600 includes a plurality of sensors 610 configured to sense objects in a scene 602, a plurality of data processors 630 configured to receive the sensor data and transform the raw data into form that is useable by the system 600, and object detection classification logic 650 configured to detect objects, classify objects, provide an associated confidence factor, determine an object location, and/or produce other desired object data.

The sensors 610 may include any sensor or device that is capable of sensing environmental data related to the scene 602 and producing corresponding data that assists in generating desired object information used herein. In the illustrated embodiment, the sensors include a visible light camera 612, an infrared camera 614, a Lidar system 616, a radar system 618 and other sensors 620. Each of the sensors 610 produces raw data that is transformed using appropriate data processing components into a format that useable by the object classification system. In the illustrated embodiment, for example, the data processors 630 include an image processor 632, a thermal image processor 634, a Lidar signal processor 638, a radar signal processor 640, and a sensor data processor 642 which corresponds to another sensor type, as needed. In one or more embodiments, the data processors 630, may perform addition data manipulation, including feature extraction for input into the object detection and classification logic 650.

The object detection and classification logic 650 includes one or more trained models 652 and (optionally, as needed) object detection logic 654 and object classification logic 656 to perform additional object detection and classification operations that are more efficiently and/or more accurately performed outside of the trained models 652. For example, object detection for some sensor types may be performed using background learning algorithms, motion detection algorithms, and other suitable algorithms. In various embodiments, the data from individual sensors may be processed separately (e.g., through separate trained AI models) and/or data from two or more sensors be combined through a fusion processor to produce a single classification.

Figure 7:
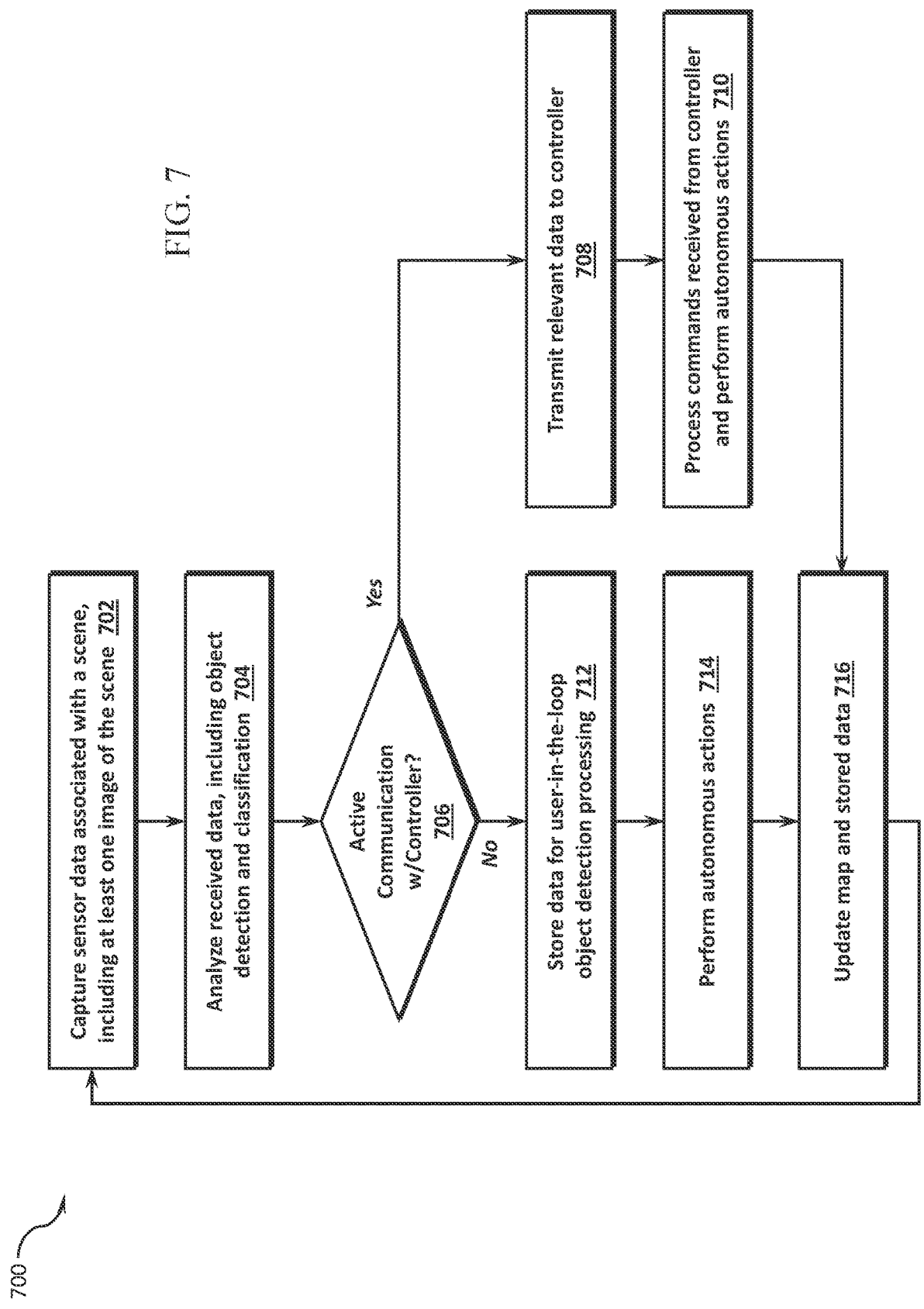
FIG. 7 illustrates an example operation of object detection and classification in a remote device using user-in-the-loop processing, in accordance with one or more embodiments.

Referring to FIG. 7, an example operation of object detection and classification in a remote device using user-in-the-loop processing will now be described in accordance with one or more embodiments. An object detection and classification process 700 starts by capturing sensor data associated with a scene, in step 702. The data includes at least one image of all or part of the scene to facilitate user review and correction of object detection data. Next, in step 704, the system analyzes the received sensor data and performs object detection and classification. If there are active communications with a control station (step 706), then relevant data is transmitted to the control station for real-time monitoring by the user (step 708). For example, a live video feed may be sent to the controller, allowing the user to provide real-time control of the remote device. Similarly, the remote device processes commands and data received from the controller, in step 710. The remote device also performs autonomous actions as required. The remote device updates its map and stored data in step 716 to capture relevant data captured or detected by the remote device.

Referring back to step 706, if there is not active communication with the controller (e.g., if the remote device is out of range), then the remote device stores data for use in user-in-the-loop object detection processing (step 712) after communications have been reestablished with the control station. The stored data may include storing a stream of sensor data from a period prior to object detection through a period after object detection, including recorded video of the object detection, and other data as appropriate. The remote device then performs autonomous actions in accordance with its mission (step 714). The map and stored data are updated as needed in order to capture relevant data captured or detected by the remote device (step 716).

Figure 8:
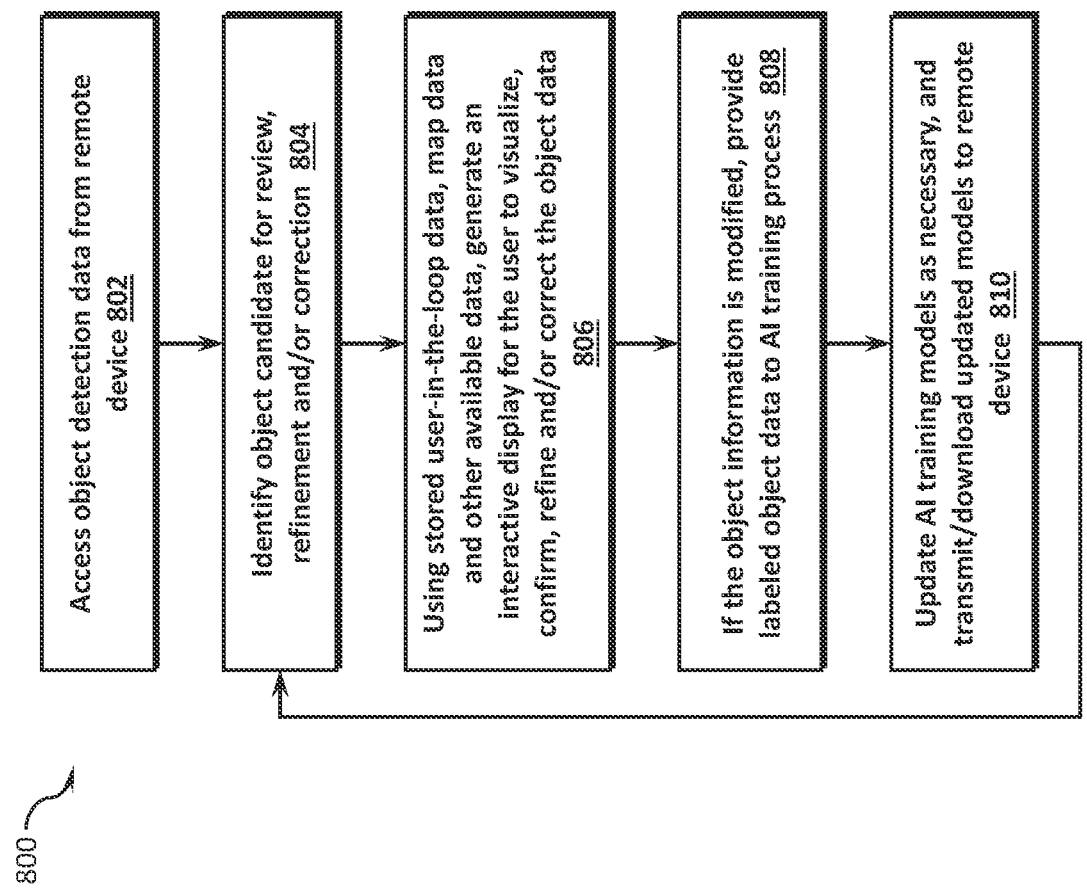
FIG. 8 illustrates an example operation of object detection and classification in a control system using user-in-the-loop processing, in accordance with one or more embodiments.

Referring to FIG. 8, an example operation of object detection and classification in a control system using user-in-the-loop processing will now be described in accordance with one or more embodiments. A user-in-the-loop process 800 starts by accessing object detection data from the remote device, in step 802. This step may take place during a time when the remote device is in range for communications, when the remote device returns home, through a network, or through another method. Next, the controller identifies object candidates for review, refinement and/or correction, in step 804. In some embodiments, the controller tracks the time when the remote device is out of range and identifies corresponding activity. The remote device may identify activity associated with periods without communication by tracking time periods without communication, tagging data acquired during the period without communication, and/or through other approaches suitable for identifying the relevant data. In some embodiments, the remote device may identify other objects for review, such as detected objects that have a low (e.g., compared to a threshold) classification confidence.

In step 806, the controller generated an interactive display to aid the user in visualizing, confirming, refining, and/or correcting the object data. The display is generated using the user-in-the-loop data stored by the remote device, map data generated by the remote device and other available data (e.g., GPS data, satellite images, etc.). In some embodiments, the display includes a video of the object detection with controls (e.g., pause, forward, back, zoom) to provide the user the ability for focus on areas of interest. The display may further include sensor data or other data generated by the remote device (e.g., active radar data associated with the detection), and user input features for identifying areas of interest or inputting corrected classifications and data values. In some embodiments, the display includes a virtual reality environment (e.g., accessible using a VR headset) allowing the user to virtually traverse the map and explore the detected object.

If the object detection data is modified, the controller may prepare a labeled data sample, including the sensor data and correct classification information, for use by the AI training process, in step 808. In some embodiments, the controller is configured to identify the types of modifications that should be forwarded, such as object misclassifications, and which types of modifications should be ignored in AI training (e.g., slight adjustment to an object location). In step 810, the controller updates the AI training models as appropriate and downloads the updated trained AI models to the remote device. In one embodiment, the AI training system tests new trained data samples received through the user-in-the-loop process to determine whether the new sample will improve or reduce the accuracy of the trained AI model. If a determination is made to add the sample to the training dataset, the AI training system generates a new trained AI model and downloads it to the remote device.

Object Tracking in a Local and Global Map

In various embodiments, the systems and methods disclosed herein use probabilities and Kalman filtering (e.g., unscented Kalman filtering) to track objects in three dimensions, within a local and global map (or other reference coordinate system), with a device (e.g., unmanned ground robot) including a multi-modal, multi-camera system. With a multi-modal, multi-camera system objects will likely be seen by multiple cameras, from multiple perspectives, at the same time. Errors in the data (e.g., due to one or more errors in the calibration of those sensors and their transforms) could result in duplication of detection data. To address these issues, systems and methods of the present disclosure take into account the position of the previous estimates, the quality of the estimate, and/or the type of object, when adding object data to a map.

Figure 9:
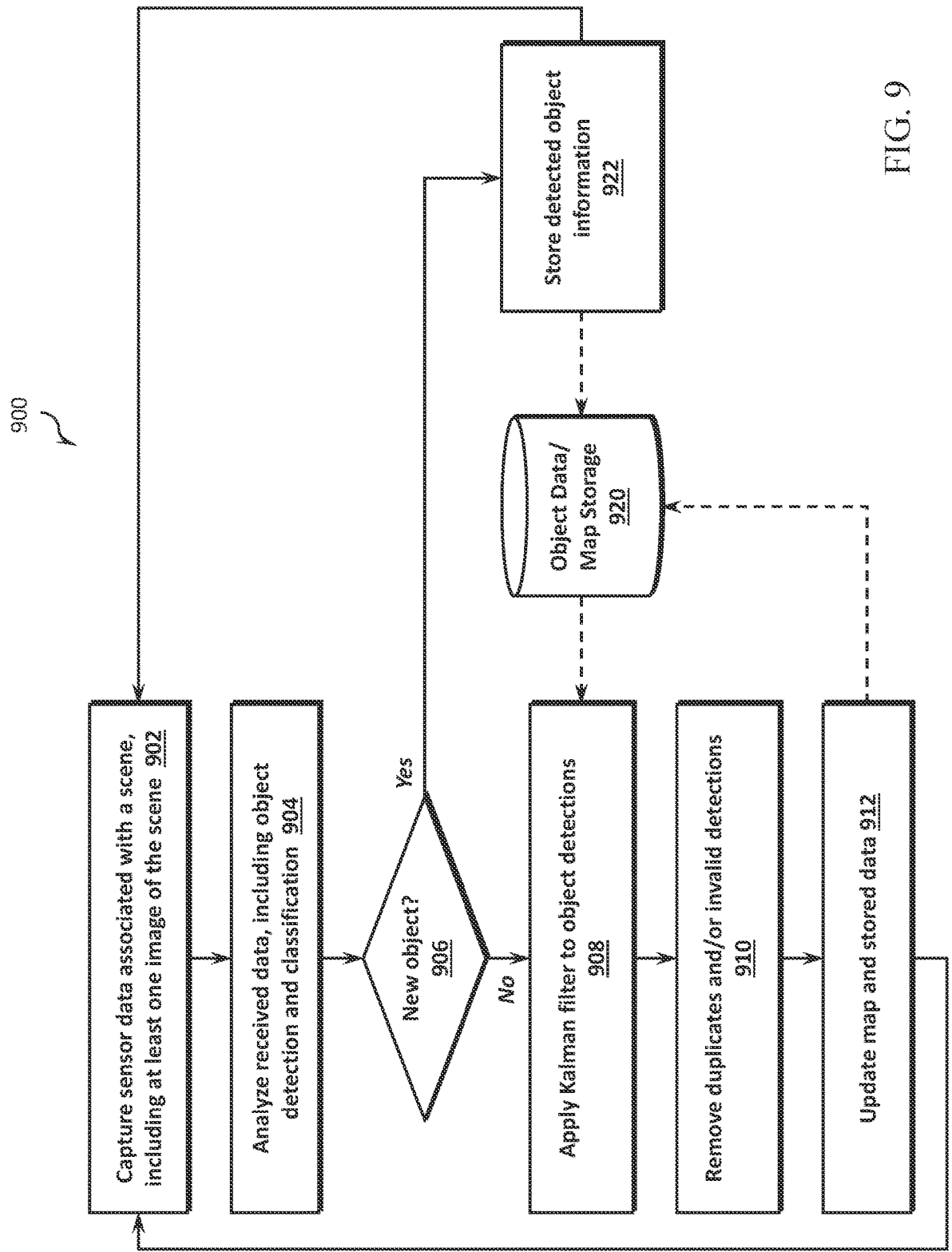
FIG. 9, illustrates an example process 900 for object tracking within a local or global map, in accordance with one or more embodiments.

Example embodiments of object tracking in a local and global map will now be described with reference to FIGS. 9-14. FIG. 9, illustrates an example process 900 for object tracking within a local or global map, in accordance with one or more embodiments. The system may include, for example, an unmanned vehicle with a multi-modal, multi-camera system to capture sensor data from a scene, a manned vehicle or device, a mobile system, a system for processing data received from a multi-modal, multi-camera system, an operator terminal, and/or other processing systems. In step 902, the system captures sensor data associated with a scene, including at least one image of the scene. In various embodiments, the system captures frames of sensor data at a rate of multiple frames per second (e.g., 15 fps).

In step 904, the system analyzes received sensor data and performs object detection, classification, and/or localization of detected objects in three-dimensional space. In various embodiments, each sensor of the system is part of a transformation tree that is relative to a root node (e.g., relative to the orientation of the device). In various embodiments, the fusion and analysis of sensor data is performed by a local object tracker component, which includes one or more neural networks configured for object detection, classification, confidence determinations, depth, location, and/or other suitable object information.

Because the group of cameras (and other sensors) use a common map representation, both local and global, the detections from each camera can be searched to determine if they already exist in the map, within some 3D positional threshold (step 906). If the detected objects don't exist, they can be added to an object storage (step 908), but if they do, the quality of the estimate can be combined with the existing probability estimate and refine the 3D position or pose of the object. The stored detection object information may include, for example, object classification, confidence, bounding box, location, etc.

With a multi-modal, multi-camera system (e.g., on a mobile robot), objects will likely be seen by multiple cameras and/or sensors, from multiple perspectives, at the same time, and error(s) in the calibration of those sensors and their transforms could result in duplication of detection data and/or differences in object classification and localization information. In step 908, the system applies a Kalman filter process to take into account previous object detection estimates (e.g., object data from previous frames and/or map storage 920), the quality of the estimates, the type of object detected, and/or other available information. In step 910, the system removes duplicates and/or invalid detections and synthesize the data into updated object information. In step 912, the system stores the updated object data in the map storage 920.

Referring back to step 906, if the detected object is new (e.g., the location of the object is not within a proximity threshold of a previously detected object), then the new object information added in step 922 to the object data and map storage 920.

Figure 10:
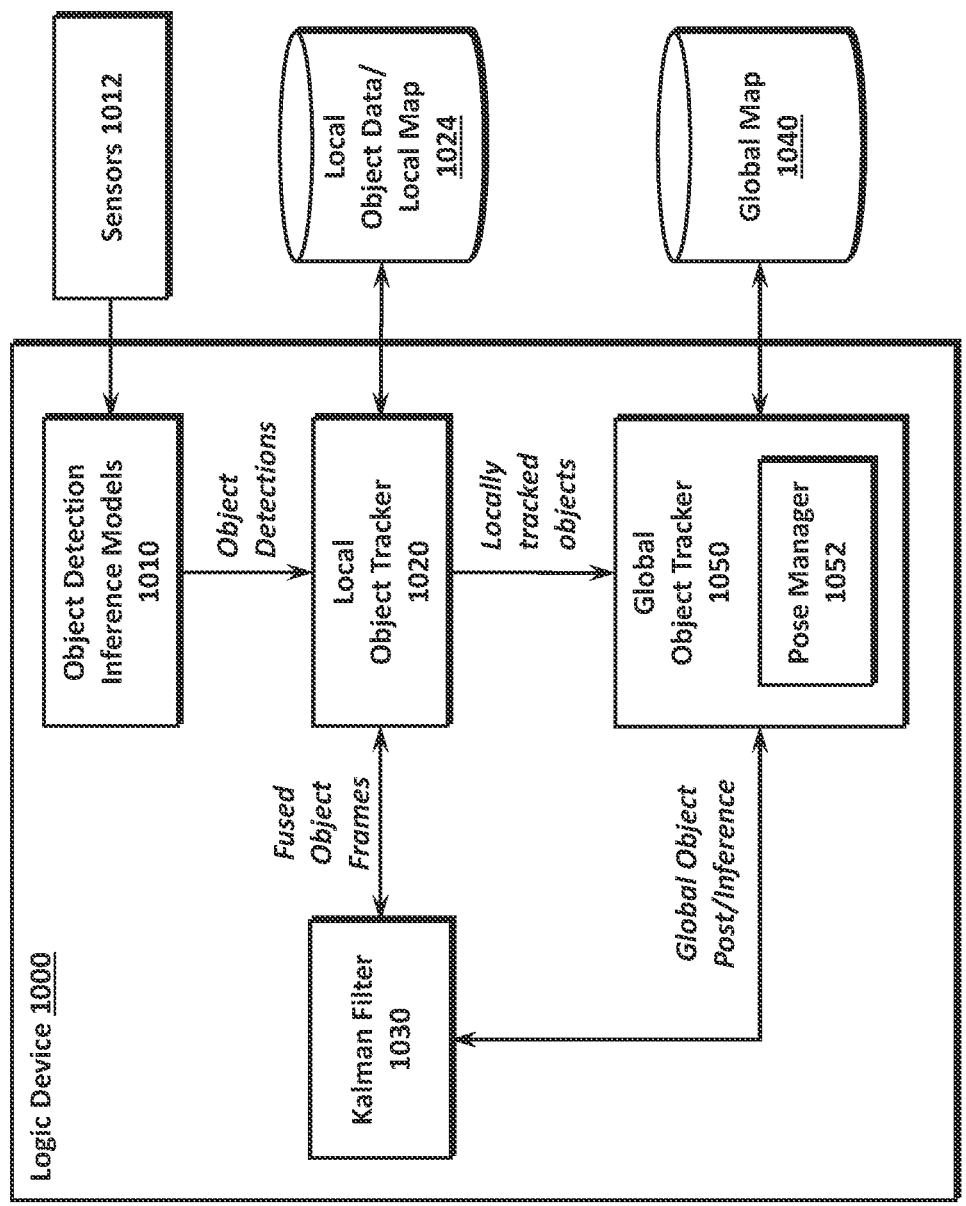
FIG. 10 illustrates an example processing system for implementing object detection and localization systems and methods, in accordance with one or more embodiments.

In various embodiments, the object detection and localization systems and methods are organized into three main logical components. An example processing system is illustrated in FIG. 10. The logic device 1000 may represent any processing system disclosed herein including an unmanned vehicle, the host system or another processing system. The components are configured to achieve object permanence within the map(s), allowing for position updates due to map optimizations.

The logic device 1000 includes a plurality of object detection inference models 1010 configured to detect objects from the sensors 1012. In various embodiments, the object detection inference models 1010 may be implemented as a plurality of CNN and/or DNN object detection inference models, and any suitable CNN/DNN may be used that provides a detection vector or similar data output comprising an object type, confidence score, and location (e.g., a bounding box). Different CNN/DNN implementations can improve the detections but the overall functionality of the tracking system in this disclosure can operate with any suitable CNN/DNN implementation, including implementations that the generate results with greater error and/or lower accuracy.

The local object tracker 1020 fuses inference detections across multiple inference models into a common frame ID using the Kalman filter 1030. The Kalman filter 1030 (e.g., unscented Kalman filter or other suitable filter) is used to track an object's pose and inference probability and merge duplicates with respect to the "base_footprint" frame. With the system including several DNNs, for example, detecting objects around the system, there is a chance that two cameras will detect the same object from different perspectives. The Kalman filter is configured to merge multiple locally tracked objects into a single tracked object, based on object type sizes. In some embodiments, the system operates based on an assumption that the system will only see one object in a particular location.

The system is also configured in some embodiment to allow the local object tracker 1020 to override the inference probabilities with stronger detections from other cameras. For example, if one camera sees the edge of one object type, with 40% probability, and another camera/sensor sees the same object as a different object type, with 85% probability, in the same location, the local object tracker will filter to the new object type with slightly less than 85% probability. The local object data and local may data may be stored in a storage device 1024, which may include a local storage, network storage, cloud storage, or other suitable storage devices.

In various embodiments, the objects tracked in the local frame are treated as non-persistent observations. Because the system can move while sensing objects, the system doesn't create a bias in the Kalman filter if another object appears in the same spatial region as a previous object. The local object tracker is configured to indicate when an object might be in the vicinity of the system, within some threshold range.

In some embodiments, a human-in-the-loop implementation provides a user interface (UI) in the form of a diagnostic viewer allowing an operator to confirm object detections. Since the objects are displayed as markers in the diagnostic viewer, it allows the user to see what is being detected around the system, without having to look at multiple camera streams with typical detection boxes. The diagnostic viewer UI allows multiple viewing options, including in various embodiments each individual camera view, with or without detection boxes, a local dynamic view of the current detections, shown in 3D on a map around the system, a cached global view of past detections, shown in 3D on a map of places that the system has been, and a combined view of both local and global maps. Any of these layers can be shown or hidden, depending on the level of detail that is needed. For the map views, 3D detections boxes, sized to match the detected object's maximum volumetric boundary, are shown to represent the 3D position of each object. In addition, video frames from each individual camera stream, including RGB, thermal, and stereo depth images can be displayed in the map view, projected out from their relative transform and shown at the far clipping plane of the camera frustum. The multimodal cameras can be combined into an aggregate image, overlaid onto each other or each one displayed individually, depending on the desired view. Displaying objects on a map provides a way to abstract the data for the user and make it easier for the user to visualize the 3D position.

Figure 11:
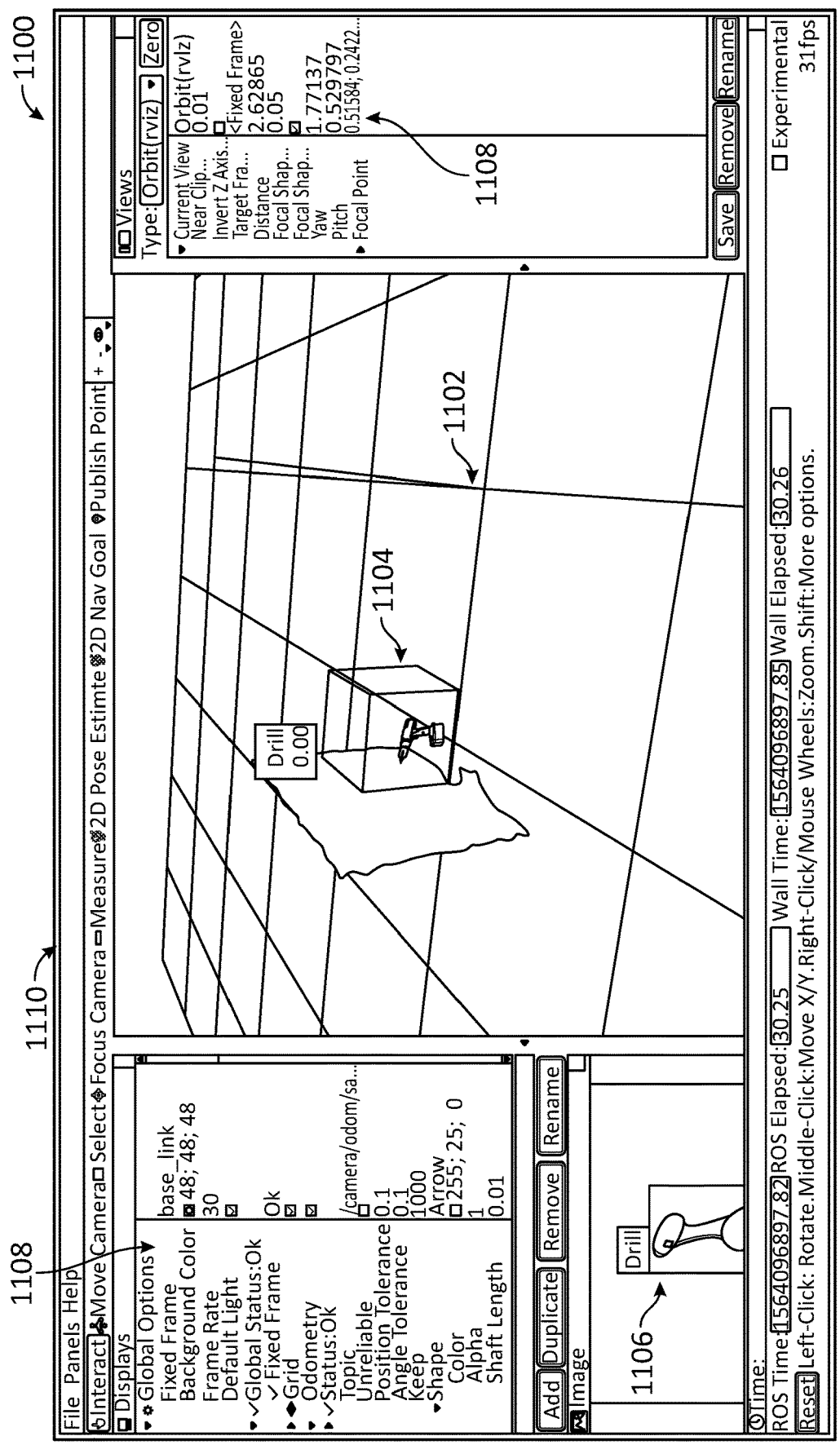
FIG. 11 illustrates an example user interface displaying local object tracker results of a three-dimensional inference, in accordance with one or more embodiments.

FIG. 11 illustrates an example of a user interface 1100 displaying local object tracker results of a 3D inference with depth camera. In this example, a local coordinate system 1102 is used, and a bounding box 1104 is displayed and classified with a degree of probability (e.g., a drill). The user interface 1100 may further include a visible image 1106 and/or video of the captured object to aid the user in the review. Object data 1108 may also be displayed for the user, including distance, shape, yaw, pitch, tolerances, time, as well as user controls 1110.

In practice has been observed that tracking objects globally in the map frame may be affected by inaccurate map optimizations, which can lead to inaccurate object reports. In addition, in practice different DNNs for different sensors can produce conflicting detections, and the system may be tuned to give one or more DNN more priority over others. In some embodiments, when the system operates in full autonomous exploration mode, it will find objects, and it is useful to provide the operator with a way to detect false detections. A proposed solution is to accompany a screen shot of the object for review by the operator as shown in FIG. 11.

Figure 12:
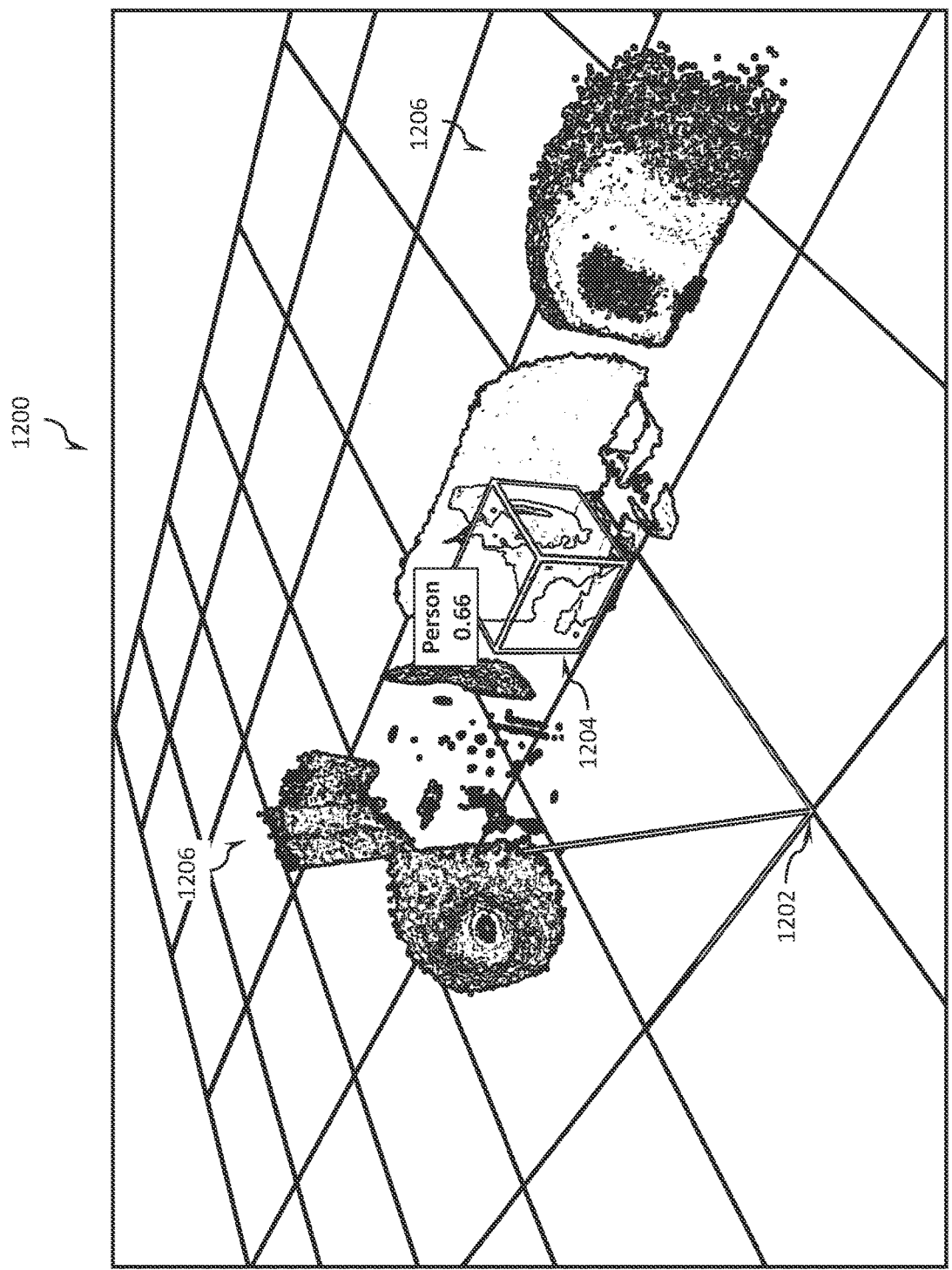
FIG. 12 illustrates example user interface view displaying three-dimensional object inference from multiple depth cameras, in accordance with one or more embodiments.

FIG. 12 illustrates an example view 1200 of local object tracker data showing 3D object inference data fused from multiple depth cameras/sensors. The 3D view includes a local coordinate system 1202, an object depicted by a bounding box 1204, and other point cloud data gathered 1206 from the various sensors.

Figure 13:
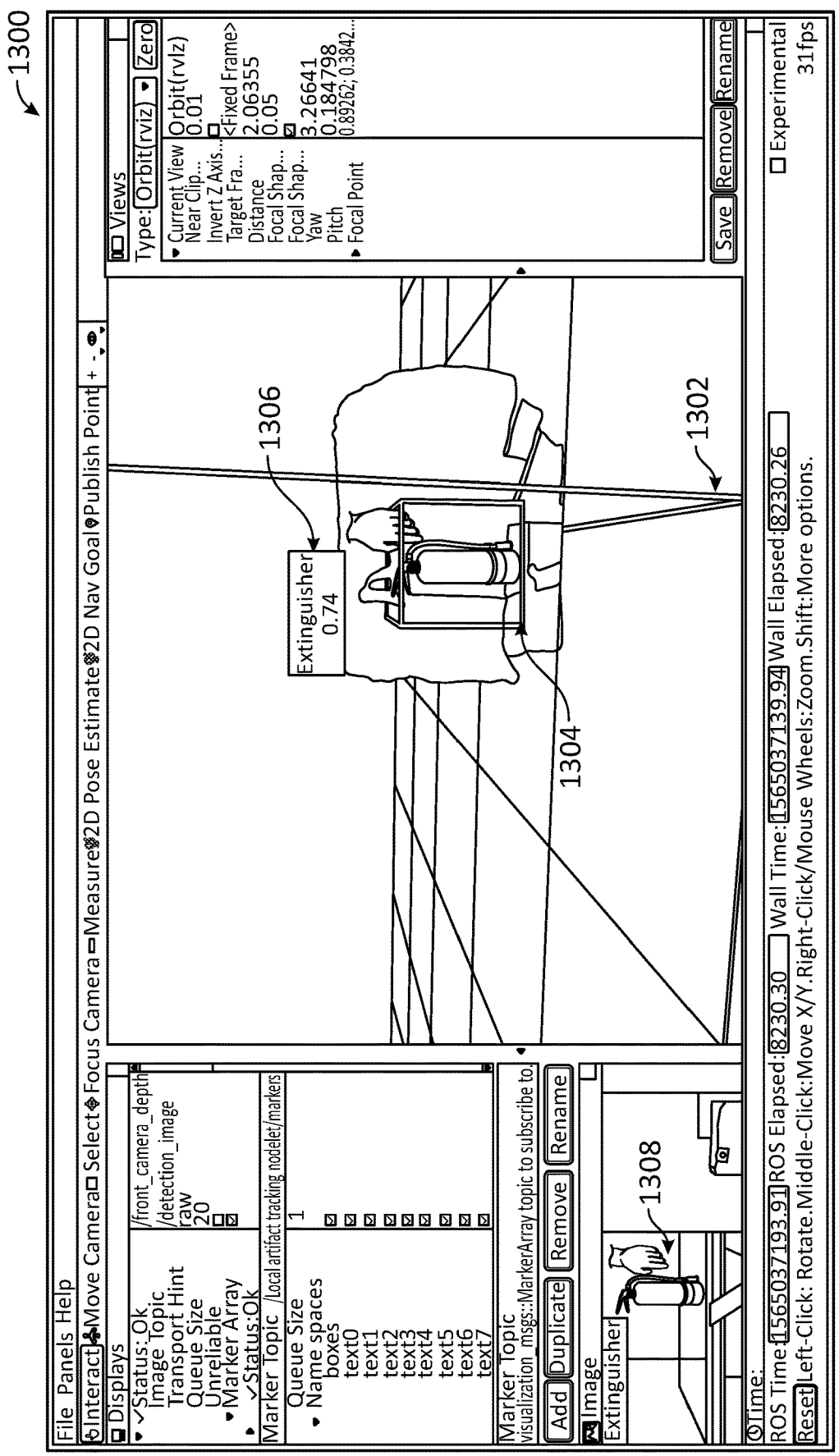
FIG. 13 illustrates an example user interface displaying a falsely classified detection of an object, in accordance with one or more embodiments.

FIG. 13 illustrates an example of a falsely classified detection of an object. A user interface 1300 presents a 3D view of the local object data, including a local coordinate system 1302, a bounding box 1304 depicting an object location, and a classification and confidence score 1306. A 2D representation is also available to provide the user with a visible image 1308 of the object/scene. The user may review objects through the user interface to delete, correct and/or confirm the object data.

Referring back to FIG. 10, the global object tracker 1050 receives the locally tracked objects from the local object tracker 1020 and tracks the objects in the global map frame. The global object tracker 1050 may also use an unscented Kalman filter 1030 to track object pose and inference probabilities. In various embodiments, global object tracker 1050 includes a mapping algorithm that runs optimizations frequently and updates the objects tracked in the global object tracker 1050. When the map is optimized, the object locations are also updated to maintain spatial accuracy. In some embodiments, the global object tracker 1050 includes a pose manager 1052 configured to track the map keyframes. As a new object is identified, the global object tracker 1050 uses the pose manager 1052 to get the current map position to translate the locally tracked object into the global map frame. The global object tracker 1050 also regularly updates a known list of tracked objects with the pose manager 1052 and updates the object's pose in the case that optimization has occurred. Optionally, the global object tracker 1050 pose updates, based on map optimizations, can be triggered through other criteria, such as via manual user input. The global object data and global map data may be stored in a storage device 1040, which may include a local storage, network storage, cloud storage, or other suitable storage devices.

Figure 14:
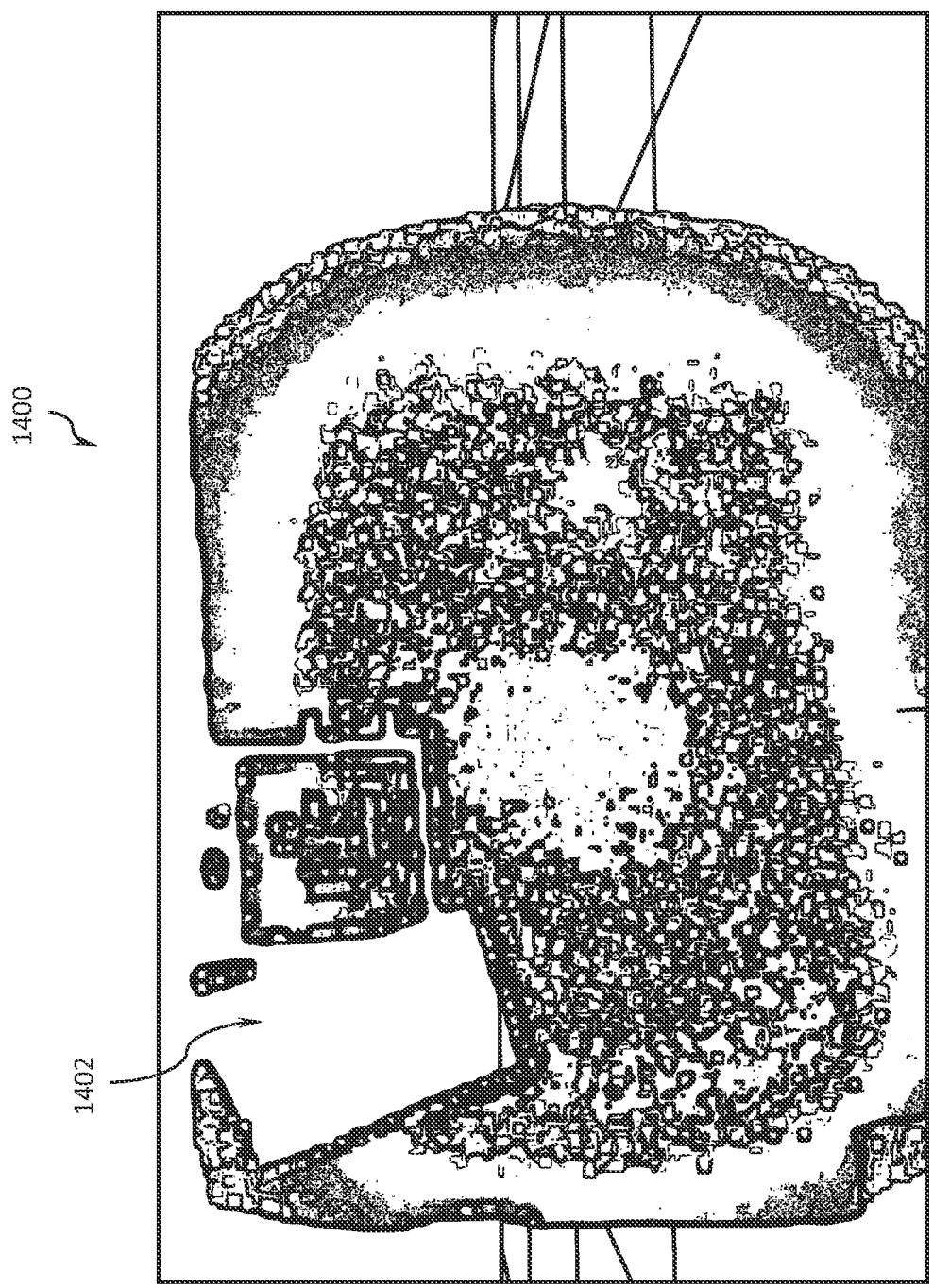
FIG. 14 illustrates an example view of an invalid camera depth result, in accordance with one or more embodiments.

In various embodiments, the depth image is used to extract the depth of an object, however, care is taken to manage null and NaN values, as some materials are IR absorbent and will create invalid depth readings. FIG. 14 illustrates example infrared data 1400 with invalid depth data. In some cases, an object may be detected that includes infrared absorbing material that generates invalid depth data 1402 for the image. There are several image processing techniques that can be utilized to fill holes and repair the depth image, but they often result in changing the depth values of the surrounding pixels. In the present disclosure, an object's depth is sampled at a frame rate (e.g., 15 fps) that allows for multiple object detections at a plurality of perspectives. In practice, it has been observed that the high frame rate allows the system to ignore frames where the depth extraction failed and wait for accurate depth readings in subsequent frame. This approach simplifies the depth problem and provides accurate depth readings of the objects.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a mobile system comprising:
a multi-modal, multi-camera system configured to capture images from multiple perspectives in a local area traversed by the mobile system; and
a first logic device configured to implement:
a plurality of object detection inference models configured to analyze the captured images from each camera to detect, classify, and localize objects therein and output associated object data comprising information associated with the detected objects; and
a local object tracker configured to track the detected objects in a local map associated with the mobile system based on the object data and update the object data across a plurality of detections using a filter to remove duplicates and calibrate location data; and
a global object tracker configured to track the detected objects from one or more local maps onto a global map associated with a real-world coordinate system, wherein a first Kalman filter is configured to update object pose and inference probabilities on the global map.

2. The system of claim 1, wherein the multi-modal, multi-camera system comprises a visible light image sensor, an infrared image sensor, a global position satellite sensor, a radar sensor and/or a Lidar sensor.

3. The system of claim 1, wherein the associated object data for each detected object comprises an object type, a confidence score, and a bounding box location in at least one image of the captured images.

4. The system of claim 1, wherein the local object tracker is configured to fuse object detections from the plurality of object detection inference models to identify locally tracked objects in a common frame.

5. The system of claim 4, wherein the filter used by the local object tracker is a second Kalman filter configured to receive a plurality of fused object detections from the local object tracker and use stored object data including stored object type, confidence score, and location to refine a type, size, location and/or pose of at least one object of the tracked objects in the common frame in the local map.

6. The system of claim 1, wherein the global object tracker further comprises a pose manager configured to track global objects in the global map and update the object pose based on updated map data.

7. The system of claim 1, wherein the multi-camera system comprises a depth camera and/or sensor configured to capture three-dimensional depth information; and wherein the local object tracker is configured to ignore frames of data having invalid depth information for the detected objects.

8. The system of claim 1, wherein the system further comprises a control system, and wherein the first logic device is further configured to:
communicate object detection information to the control system when within a range of communications of the control system; and
generate and store object analysis information for a user of the control system when not in communication with the control system;
wherein the object data is generated to facilitate user detection and classification of the detected objects.

9. The system of claim 1, wherein the mobile system comprises an unmanned ground vehicle (UGV), and unmanned aerial vehicle (UAV), and/or an unmanned marine vehicle (UMV).

10. The system of claim 1, wherein the object detection inference models are configured to generate object data comprising a detection vector comprising an object type, confidence score, and bounding box location in the local map.

11. The system of claim 1, further comprising a control system, wherein the control system is configured to facilitate user monitoring of the object data, the control system comprising:
a display screen;
a user interface;
a second logic device configured to display at least a portion of the object data for a user to facilitate detection and classification of at least one detected object of the detected objects by the user; and
update object detection data in accordance with user input.

12. The system of claim 1, wherein the mobile system comprises an unmanned vehicle adapted to traverse a search area and generate the object data associated with one or more objects detected in the search area.

13. A method comprising:
operating a mobile system comprising a plurality of sensors and a multi-camera system configured to capture images from multiple perspectives in a local area traversed by the mobile system;
receiving data from the plurality of sensors and the multi-camera system;
detecting an object in the received data using a plurality of object detection inference models configured to analyze the captured images from each camera to detect, classify, and localize objects therein and output associated object data comprising information associated with the detected objects;
tracking, using a local object tracker, detected objects in a local map associated with the mobile system based on the object data and update the object data across a plurality of detections using a filter to remove duplicates and calibrate location data;
tracking, using a global object tracker, the detected objects from one or more local maps onto a global map associated with a real-world coordinate system; and
updating, using a first Kalman filter, object pose and inference probabilities on the global map.

14. The method of claim 13, wherein the data received from the plurality of sensors and multi-camera system comprises visible light image data, infrared image data, global position satellite data, radar data and/or Lidar data.

15. The method of claim 13, wherein the associated object data for each detected object comprises an object type, a confidence score, and a bounding box location in at least one image of the captured images.

16. The method of claim 13, wherein tracking, using the local object tracker, detected objects in a local map, further comprises fusing object detections from the plurality of object detection inference models to identify locally tracked objects in a common frame.

17. The method of claim 13, wherein using the filter by the local object tracker comprises performing filtering, using a second Kalman filter, across a plurality of frames of object detection data including using stored object data including stored object type, confidence score, and location to refine a type, size, location and/or pose of at least one object of the tracked objects in the common frame in the local map.

18. The method of claim 13, further comprising
updating global object information using a pose manager based on updated map data.

19. The method of claim 13, wherein the plurality of sensors and/or the multi-camera system is further configured to capture three-dimensional depth information; and
wherein the method further comprises ignoring frames of data having invalid depth information for the detected object.

20. The method of claim 13, further comprising:
displaying, using a second logic device, at least a portion of the object data for a user to facilitate detection and classification of at least one detected object of the detected objects by the user; and
updating, using a user interface, object detection data in accordance with user input.

* * * * *